(12) United States Patent
Nichols

(10) Patent No.: US 11,598,631 B2
(45) Date of Patent: Mar. 7, 2023

(54) DETERMINING DEPTH OF BURIED ASSETS

(71) Applicant: Trimble Inc., Sunnyvale, CA (US)

(72) Inventor: Mark Nichols, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 161 days.

(21) Appl. No.: 17/213,993

(22) Filed: Mar. 26, 2021

(65) Prior Publication Data

US 2022/0307820 A1    Sep. 29, 2022

(51) Int. Cl.
| | |
|---|---|
| *G01B 11/22* | (2006.01) |
| *G06T 7/73* | (2017.01) |
| *G01B 11/02* | (2006.01) |
| *G01B 11/03* | (2006.01) |
| *G01S 17/08* | (2006.01) |
| *G01S 17/89* | (2020.01) |

(52) U.S. Cl.
CPC ............ *G01B 11/22* (2013.01); *G01B 11/026* (2013.01); *G01B 11/03* (2013.01); *G01S 17/08* (2013.01); *G01S 17/89* (2013.01); *G06T 7/73* (2017.01)

(58) Field of Classification Search
CPC ....... G01B 11/22; G01B 11/026; G01B 11/03; G01S 17/08; G01S 17/89; G06T 7/73; G06T 10/06; G06T 19/006; G06T 7/50; G06Q 10/06; G06Q 50/06
See application file for complete search history.

(56) References Cited

U.S. PATENT DOCUMENTS

| | | | | |
|---|---|---|---|---|
| 7,737,965 B2 * | 6/2010 | Alter | ..................... | G06F 3/0346 715/764 |
| 9,367,963 B2 * | 6/2016 | Finn | ......................... | G06T 7/73 |
| 9,465,129 B1 * | 10/2016 | Olsson | ..................... | G01V 3/15 |
| 10,037,627 B2 * | 7/2018 | Hustad | .................. | G06T 19/006 |
| 10,872,466 B1 * | 12/2020 | Hurd | ......................... | G06T 7/70 |
| 2009/0293012 A1 * | 11/2009 | Alter | ...................... | G06T 15/10 715/848 |

(Continued)

FOREIGN PATENT DOCUMENTS

| | | |
|---|---|---|
| KR | 10-1918486 B1 | 11/2018 |
| KR | 2019-0114696 A | 10/2019 |

OTHER PUBLICATIONS

Transcript and associated screen shots for YouTube video "Augmented Reality Underground Utilities", by Bentley® Applied Research, Bentley Systems, Inc., published on Jul. 20, 2013; (total length of video: 3:57), 28 pages. Downloaded Sep. 26, 2019 at https://www.youtube.com/watch?v=KS_5OHoHHuo.

(Continued)

*Primary Examiner* — Jonathan M Hansen
(74) *Attorney, Agent, or Firm* — Kilpatrick Townsend & Stockton LLP

(57) ABSTRACT

Techniques for determining a depth of a buried asset are provided. A first point on an AR model of the buried asset is identified. The first point is where a depth of the buried asset is to be determined. An AR device is used to determine coordinates of a second point on a surface corresponding to the first point on the AR model. Coordinates of a third point on the buried asset corresponding to the first point on the AR model are determined. The depth of the buried asset is determined based on the coordinates of the second point on the surface and coordinates of the third point on the buried asset.

20 Claims, 14 Drawing Sheets

(56) References Cited

U.S. PATENT DOCUMENTS

| | | | |
|---|---|---|---|
| 2012/0127161 A1* | 5/2012 | Wallbom | G06T 19/006 345/419 |
| 2013/0182009 A1 | 7/2013 | Nielsen et al. | |
| 2017/0046877 A1 | 2/2017 | Hustad et al. | |

OTHER PUBLICATIONS

Meehan, B., "NJ Utility on Forefront with New Mixed Reality Application," Jun. 14, 2017, Associated screen shots for article, 7 pages, downloaded Oct. 23, 2019 at, https://www.esri.com/about/newsroom/publications/wherenext/nj-utility-on-forefront-with-new-mixed-reality-application/.

Transcript and associated screen shots for YouTube videos found on "vGIS Locate Infrastructure Faster and Prevent Errors", by ESRI, 40 pages, downloaded on Sep. 26, 2019. https://www.vgis.io/esri-augmented-reality-gis-ar-for-utilities-municipalities-locate-and-municipal-service-companies/.

U.S. Appl. No. 16/439,579, First Action Interview Pilot Program Pre-Interview Communication dated May 1, 2020, 4 pages.

U.S. Appl. No. 16/439,579, First Action Interview Office Action Summary dated Jun. 30, 2020, 5 pages.

U.S. Appl. No. 16/439,579, Notice of Allowance dated Aug. 21, 2020, 8 pages.

The extended European Search Report for Application No. 22162946.2-1210, dated Aug. 12, 2022, 11 pages.

Stylianidis, E. et al., "Augmented Reality Geovisualisation for Underground Utilities," PFG—Journal of Photogrammetry, Remote Sensing and Geoinformation Science, vol. 88, No. 2, Apr. 1, 2020, pp. 173-185, retrieved from the Internet: https://www.dfki.de/fileadmin/user_upload/import/10864_Stylianidis2020.pdf.

\* cited by examiner

DETERMINING DEPTH OF BURIED ASSETS

BACKGROUND

Embodiments described herein relate generally to determining depth of buried assets, and more particularly, to determining depth of buried assets using augmented reality (AR) devices.

BACKGROUND

Some AR applications enable users to apply digital objects to real-world environments. As examples, structures can be superimposed on images of a plot of land where the structure will be built, or planned features can be superimposed on images of a structure where the features will be added. Another use is to show buried assets such as pipes or buried utilities superimposed on the ground above where the assets are buried. These applications can be used to show where the assets are located in relation to objects that are above the ground. Some AR applications can also be used to show assets such as pipes or utilities that are located in or behind walls or above ceilings superimposed on images of the walls or ceilings.

Many buried assets have associated asset data or asset attributes that describe, for example, the type of buried asset (e.g., water pipe, electrical line, etc.), a size and/or shape of the buried asset, location information associated with the buried asset, and the like. The location information may include, for example, three dimensional (3D) coordinates of the position of the asset at discrete points. The location information is useful for locating or maintaining the buried assets.

The value of location information of buried assets can be difficult to realize in many situations. For example, knowing that a pipe passes through $(x_1, y_1, z_1)$ and $(x_2, y_2, z_2)$ coordinates may be of little benefit if coordinates of one or more points above the ground are not known. Also, the surface of the ground may change over time, or it may vary within a given area making it difficult to know how far below the surface an asset is located at a particular point. Thus, improved methods and devices for locating buried assets are desired.

SUMMARY

Some of the embodiments described herein provide methods and devices for determining the depth of buried assets. An example of a buried asset is a pipe buried in the ground. The depth may be determined using an AR device that allows a user to view an AR model of the buried asset superimposed on images of the ground. In an embodiment, the user may identify a point on the AR model or a point on the ground where depth information is desired, and the AR device can determine coordinates of the point and the depth of the buried asset below the point.

In accordance with a specific embodiment, for example, a method for determining a depth of a pipe buried in the ground includes using an AR device to view an AR model of the pipe. The AR model is projected onto a virtual surface or plane that is arranged to approximately correspond to a surface of the ground. The AR model is superimposed onto an image that includes the surface of the ground and that is displayed on a display of the AR device. The AR model is a two-dimensional (2D) or three-dimensional (3D) representation of the pipe projected onto the virtual surface or plane at locations directly above the pipe. The method also includes identifying a first point on the AR model of the pipe where a depth of the pipe below the surface of the ground is to be determined and using the AR device to determine real-world coordinates of a second point on the surface of the ground corresponding to the first point on the AR model of the pipe. Determining the real-world coordinates of the second point includes aligning the AR device with the second point and performing steps comprising: determining real-world coordinates of the AR device, determining an orientation of the AR device, and determining a distance from the AR device to the second point. The method also includes determining real-world coordinates of a third point on the pipe buried in the ground corresponding to the first point on the AR model of the pipe projected onto the virtual surface or plane directly above the pipe. A depth of the pipe buried in the ground is determined based on a difference in elevation between the real-world coordinates of the second point on the surface of the ground and the real-world coordinates of the third point on the pipe.

In an embodiment, the virtual surface or plane is arranged at a fixed distance from the real-world coordinates of the AR device.

In another embodiment, the virtual surface or plane is arranged relative to the real-world surface using asset data associated with the pipe buried in the ground.

In another embodiment, the first point on the AR model of the pipe is identified on the AR model superimposed onto the image and displayed on the display of the AR device.

In another embodiment, the orientation of the AR device is determined at least in part based on movement of the AR device.

In yet another embodiment, the real-world coordinates of the third point on the pipe buried in the ground are determined using asset data associated with the pipe.

In accordance with another embodiment, an AR device includes a position measurement apparatus for determining real-world coordinates of the AR device, one or more sensors for determining tilt of the AR device, a distance measuring apparatus for determining distances between the AR device and surrounding objects, an imaging apparatus for obtaining image information, and a display for displaying the image information and for displaying an AR model superimposed onto the image information. The AR device is configured for determining depth of a buried asset by: receiving as input an identification of a first point on the AR model where a depth of the buried asset is to be determined, determining real-world coordinates of a second point on the real-world surface corresponding to the first point on the AR model of the buried asset, determining real-world coordinates of a third point on the buried asset corresponding to the first point on the AR model of the buried asset, and determining the depth of the buried asset either above, below, or laterally from the second point on the real-world surface based on the real-world coordinates of the second point on the real-world surface and the real-world coordinates of the third point on the buried asset. The real-world coordinates of the second point are determined while the AR device is aligned with the second point and includes steps comprising: determining real-world coordinates of the AR device using the position measurement apparatus, determining an azimuth of the AR device, determining a tilt of the AR device using the one or more sensors; and determining a distance from the AR device to the second point using the distance measuring apparatus. The AR model is a 2D or 3D representation of the buried asset projected onto a virtual surface or plane that is arranged to approximately correspond to a real-world surface that extends between a user of the AR device and the buried asset, the AR model being superimposed onto the image information that includes the real-world surface and that is displayed on the display of the AR device.

In an embodiment, the buried asset is a pipe or conduit, and the real-world surface is the ground or a ceiling, floor, or wall of a structure.

In another embodiment, the position measurement device is a global navigation satellite system (GNSS) device, and the distance measuring device is an electronic distance measurement (EDM) device. In some embodiments, the GNSS device may be a lidar device.

In another embodiment, the AR device is further configured to output the depth of the buried asset on the display.

In another embodiment, the azimuth of the AR device is determined based on movement of the AR device.

In yet another embodiment, the AR device includes a smart phone or tablet.

In accordance with yet another embodiment, a non-transitory computer readable medium storing instructions that, when executed by a processor, cause an AR device to determine a depth of a buried asset by performing steps including superimposing an AR model onto image information that includes a real-world surface and that is displayed on a display of the AR device. The AR model is projected onto a virtual surface or plane that is arranged to approximately correspond to the real-world surface that extends between a user of the AR device and the buried asset. The AR model is a 2D or 3D representation of the buried asset. Other steps include receiving as input an identification of a first point on the AR model of the buried asset where the depth of the buried asset is to be determined, and determining real-world coordinates of a second point on the real-world surface corresponding to the first point on the AR model of the buried asset. The real-world coordinates of the second point are determined while the AR device is aligned with the second point and includes steps comprising: determining real-world coordinates of the AR device, determining an orientation of the AR device, and determining a distance from the AR device to the second point. Other steps include determining real-world coordinates of a third point on the buried asset corresponding to the first point on the AR model of the buried asset, and determining the depth of the buried asset either above, below, or laterally from the second point on the real-world surface based on the real-world coordinates of the second point on the real-world surface and the real-world coordinates of the third point on the buried asset.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The accompanying drawings, which are included to provide a further understanding of the embodiments described herein, are incorporated in and constitute a part of this specification, and together with the detailed description, serve to explain the principles of the various embodiments. No attempt is made to show structural details in more detail than may be necessary for a fundamental understanding of the various embodiments and ways in which they may be practiced.

In the appended figures, similar components and/or features may have the same numerical reference label.

DETAILED DESCRIPTION

Some of the embodiments described herein provide methods and devices for determining the depth of buried assets. As used herein, buried assets are not limited and can be any buried object such as a pipe, conduit, cable, underground vault, underground utilities, storm water pipe, or the like. Many buried assets, particularly those owned and managed by municipalities, have associated asset data or asset attributes that describe the asset and provide information such as size, shape, and location. The asset data may be stored in any manner such as in a database. The location information may include 3D coordinates of positions of the asset in a real-world coordinate frame or with reference to other points or objects. Some embodiments use an AR device to determine a depth of the buried assets. The AR device may provide an AR model of the buried asset superimposed on images of a surface such as the ground. Using the AR device, a user may identify a point on the AR model or a point on the ground where depth information is desired, and the AR device can determine coordinates of the point and the depth of the buried asset below the point. This can be useful for managing, locating, and servicing buried assets.

Figure 1:
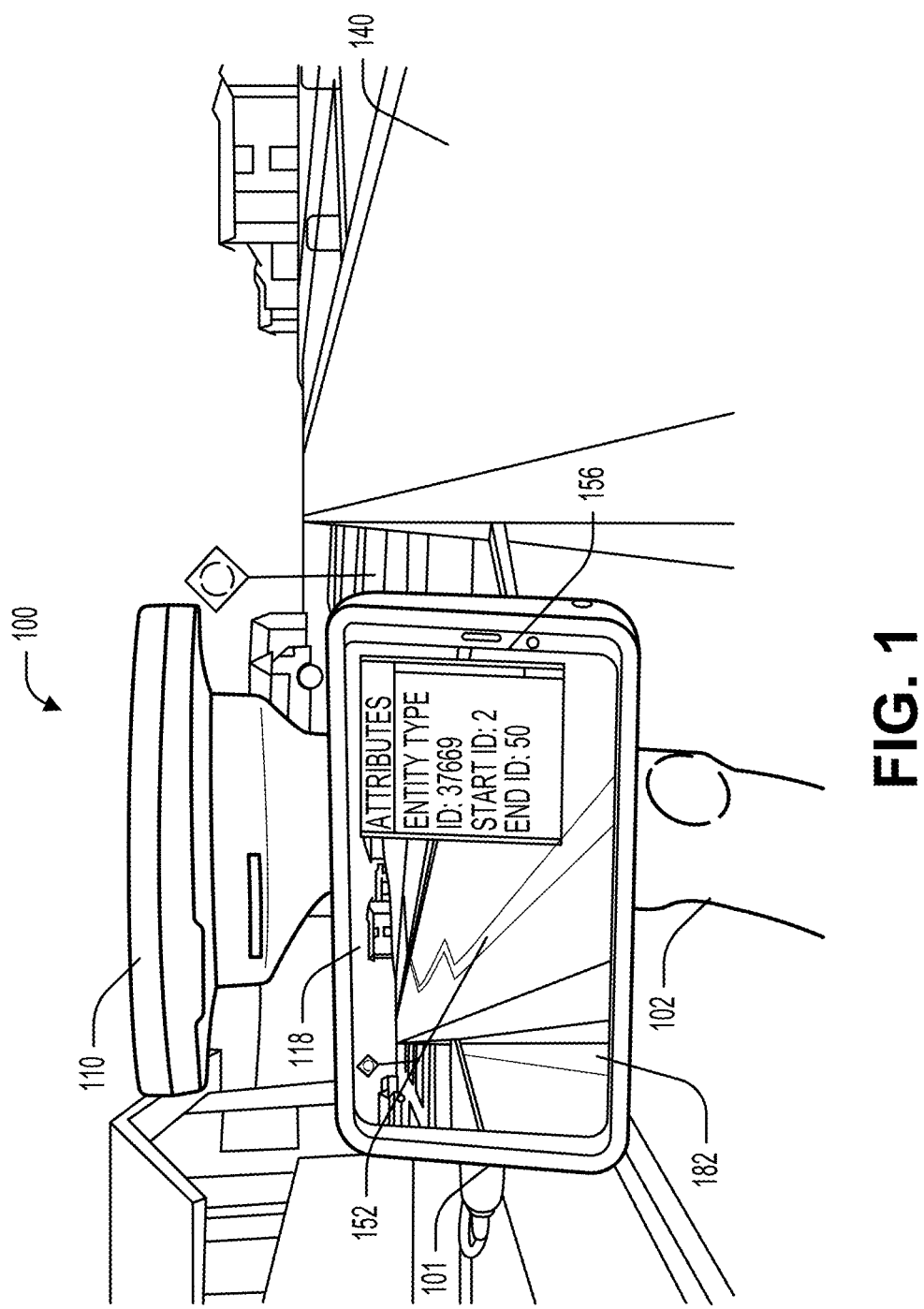
FIG. 1 is a simplified diagram showing an exemplary AR device having an AR model superimposed on image information.

FIG. 1 is a simplified diagram showing an exemplary AR device 100 having an AR model 152 superimposed on image information. The AR device 100 may include an imaging apparatus (e.g., a camera component) 101 attached to a sensor component 102. The AR device 100 may be used at a construction site 140 or at any location where two dimensional (2D) or three dimensional (3D) rendered AR models may be displayed and superimposed onto images of real-world objects such as the ground, water, stationary objects (e.g., roads, trees, buildings, walls, ceilings, etc.), movable objects (e.g., people, animals, vehicles, etc.), among other possibilities.

The camera component 101 may include a camera 116 (shown in FIGS. 2A and 2B) for capturing a camera image 118 and a display 156 for displaying the AR model 152 that is superimposed onto the camera image 118 (collectively referred to as a superimposed image 182). In this example, the AR model 152 is a digital representation of a pipe that is buried in the ground. In the superimposed image 182, the AR model 152 appears to be a 2D projection of the pipe painted on a surface of the ground above the buried pipe. Providing a 2D projection onto the ground surface can reduce or eliminate parallax issues observed when providing 3D AR models in real-world locations.

The sensor component 102 may include a position measurement apparatus (e.g., a global navigation satellite system (GNSS) receiver) 110 for providing a position of the GNSS receiver 110. The sensor component 102 may also include a distance measuring apparatus (e.g., an electronic distance measurement (EDM) device) 146 (shown in FIGS. 2A and 2B) for measuring distances to points within the field of view of the camera 116. While the EDM 146 is not limited to a particular device or technology, in some embodiments, the EDM device 146 is a lidar device that transmits pulsed laser light towards a point of interest and measures the reflected pulses with a sensor. The distance between the lidar device and the point of interest is estimated based on the return time. In some embodiments, the EDM device 146 is a radar device that transmits an electromagnetic signal via an antenna towards the point of interest and measures a reflected electromagnetic signal via the transmitting antenna or a different receiving antenna. The distance between the radar device and the point of interest is estimated based on the return time. The EDM device 146 may detect distances in a single direction or, in some embodiments, the EDM device 146 may detect distances in multiple directions and may generate a distance map comprising a plurality of detected distances.

Each of the camera component 101 and the sensor component 102 may comprise one or more structural components to support the attachment or integration of other components. For example, the sensor component 102 may include a frame that allows attachment or integration of the GNSS receiver 110 to the frame and attachment or integration of the EDM device 146 to the frame. When attached or integrated to the frame, the GNSS receiver 110 may have a known physical relationship to the EDM device 146. As another example, the camera component 101 may include a structural component that allows the camera component 101 to be removably or permanently attached to the sensor component 102 or the frame thereof. Similarly, the sensor component 102 may include a structural component that allows the sensor component 102 to be removably or permanently attached to the camera component 101. The above-described structural components may include screws, bolts, nuts, brackets, clamps, magnets, adhesives, etc., to assist in attachment of the various components.

Figure 2B:
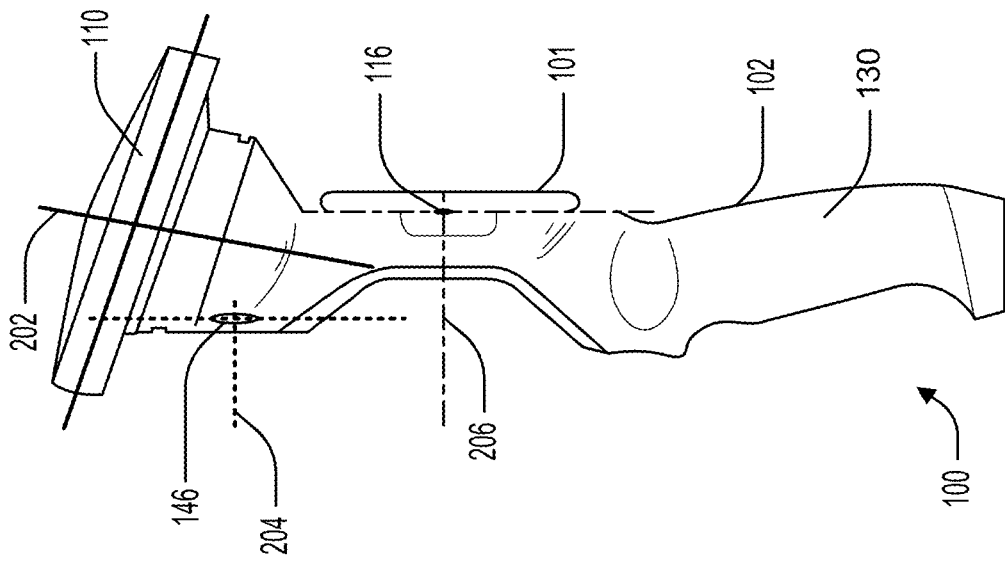
FIGS. 2A-2B are simplified front and side views of an exemplary AR device that may be used to implement some of the embodiments described herein.
Figure 2A:
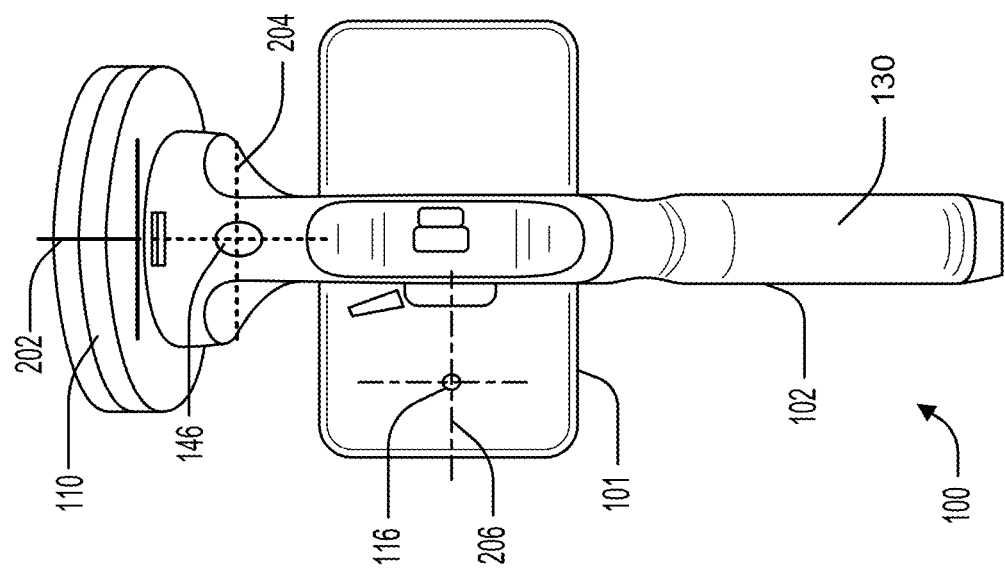

FIGS. 2A-2B are simplified front and side views of an exemplary AR device that may be used to implement some of the embodiments described herein. These figures show the camera component 101 attached to the sensor component 102. In the illustrated embodiment, the position and orientation of the GNSS receiver 110 is indicated by crosshairs 202, the position and orientation of the EDM device 146 is indicated by crosshairs 204, and the position and orientation of the camera 116 is indicated by crosshairs 206. The position of the GNSS receiver 110 may correspond to a phase center of the receiver's antenna, the position of the EDM device 146 may correspond to the location(s) of the device's emitter and/or receiver, and the position of the camera 116 may correspond to a point where the camera aperture is located (in accordance with the pinhole camera model). When the camera component 101 is attached to the sensor component 102, detection of the orientation and position of any one of the three devices can be used to obtain the orientations and positions of the other two devices. Furthermore, detection of the orientations and positions of two of the three devices may allow a more accurate calculation of the orientation and position of the remaining device.

The AR device 100 may be a handheld device and may incorporate a handle 130 that facilitates handling of the AR device 100 by a user. The handle 130 may be formed as an integral part of the frame of the sensor component 102. Although a handheld AR device 100 is described as an exemplary device via which the technology described herein may be implemented, the present technology may be implemented via other AR devices, including, but not limited to, handheld devices, such as smart phones or tablets, hands-free devices, wearable devices, smart glasses, or any devices that may incorporate AR capabilities.

Figure 3:
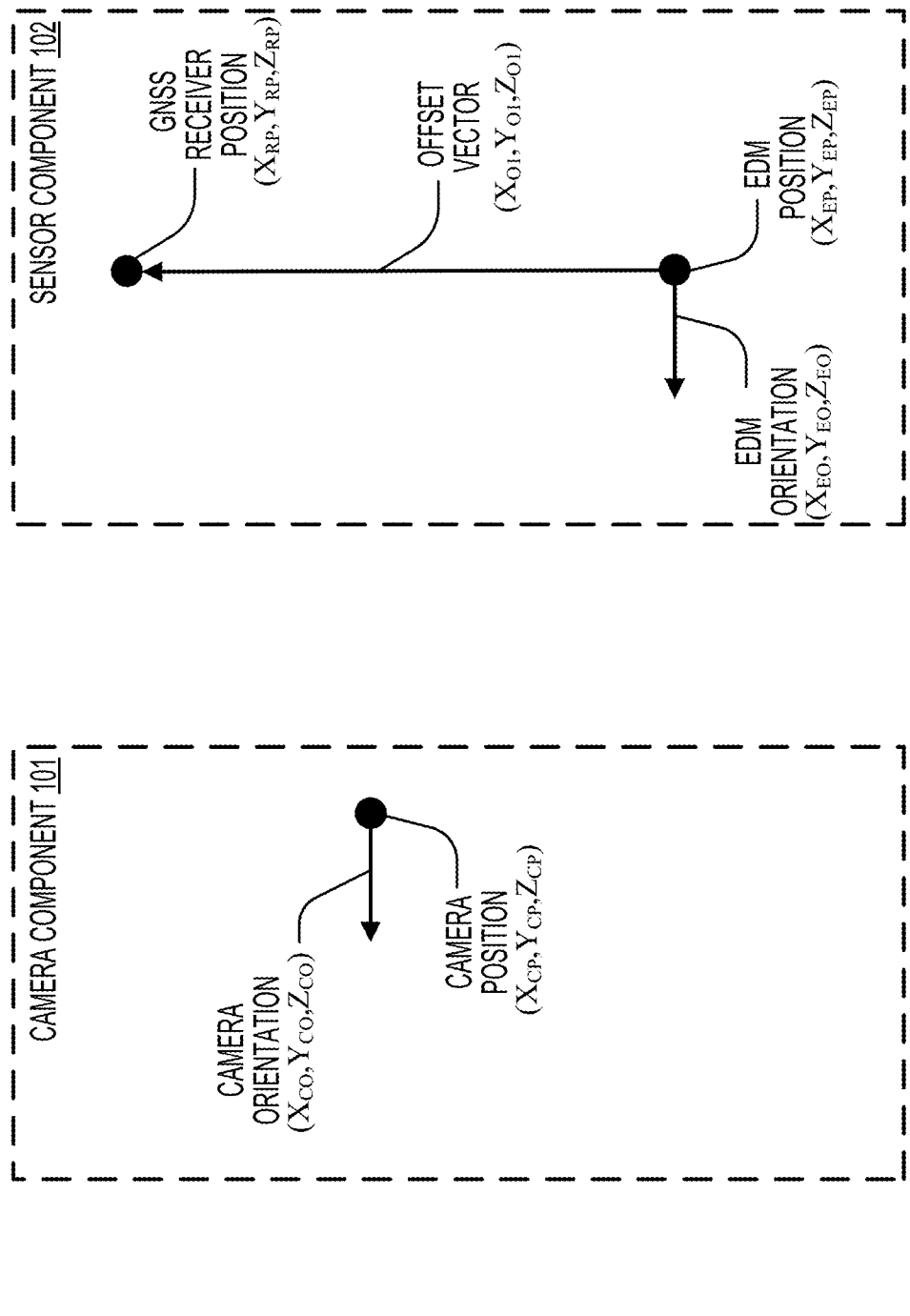
FIGS. 3-4 are simplified diagrams showing position and orientation relationships of AR devices.

FIG. 3 is a simplified diagram showing the position and orientation relationships of an AR device in which a camera component is detached from a sensor component. In the illustrated embodiment, a first offset vector $(X_{O1},Y_{O1},Z_{O1})$ is defined as the vector extending between the position of the EDM device 146 $(X_{EP},Y_{EP},Z_{EP})$ and the position of the GNSS receiver 110 $(X_{RP},Y_{RP},Z_{RP})$. In some embodiments, knowledge of the first offset vector $(X_{O1},Y_{O1},Z_{O1})$ and one of the position of the EDM device 146 $(X_{EP},Y_{EP},Z_{EP})$ and the position of the GNSS receiver 110 $(X_{RP},Y_{RP},Z_{RP})$ can be used to find the other of the position of the EDM device 146 $(X_{EP},Y_{EP},Z_{EP})$ and the position of the GNSS receiver 110 $(X_{RP},Y_{RP},Z_{RP})$. In some embodiments, the relationship between (e.g., angle formed by) the first offset vector $(X_{O1},Y_{O1},Z_{O1})$ and the orientation of the EDM device 146 $(X_{EO},Y_{EO},Z_{EO})$ is known and may be utilized in a way such that knowledge of the orientation of the EDM device 146 $(X_{EO},Y_{EO},Z_{EO})$ and one of the position of the EDM device 146 $(X_{EP},Y_{EP},Z_{EP})$ and the position of the GNSS receiver 110 $(X_{RP},Y_{RP},Z_{RP})$ can be used to find the other of the position of the EDM device 146 $(X_{EP},Y_{EP},Z_{EP})$ and the position of the GNSS receiver 110 $(X_{RP},Y_{RP},Z_{RP})$.

Figure 4:
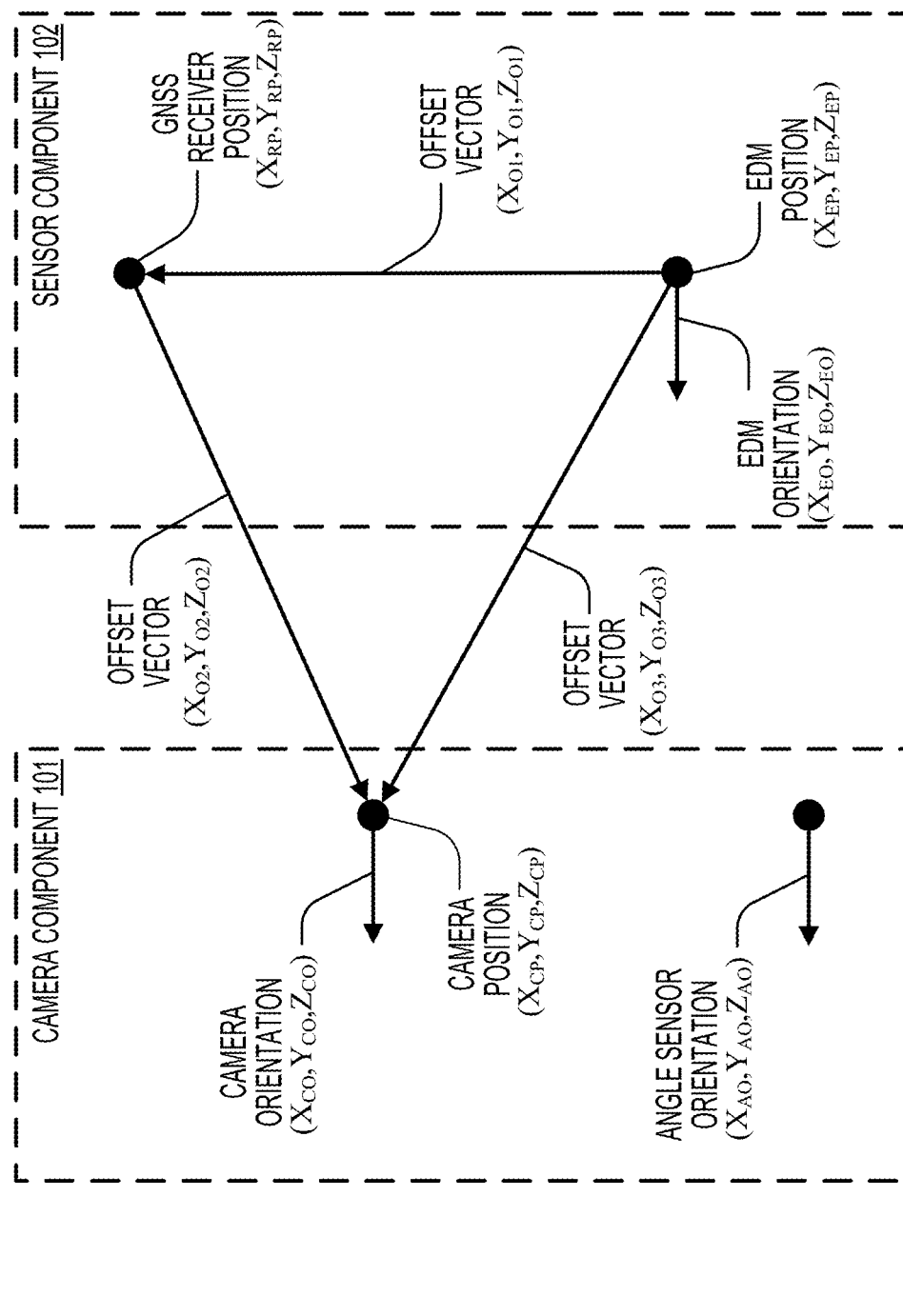

FIG. 4 is a simplified diagram showing position and orientation relationships of an AR device in which a camera component is attached to a sensor component. In the illustrated embodiment, a second offset vector $(X_{O2},Y_{O2},Z_{O2})$ is defined as the vector extending between the position of the GNSS receiver 110 $(X_{RP},Y_{RP},Z_{RP})$ and the position of the camera 116 $(X_{CP},Y_{CP},Z_{CP})$, and a third offset vector $(X_{O3},Y_{O3},Z_{O3})$ is defined as the vector extending between the position of EDM device 146 $(X_{EP},Y_{EP},Z_{EP})$ and the position of the camera 116 $(X_{CP},Y_{CP},Z_{CP})$. In some embodiments, knowledge of the second offset vector $(X_{O2},Y_{O2},Z_{O2})$ and one of the position of the GNSS receiver 110 $(X_{RP},Y_{RP},Z_{RP})$ and the position of the camera 116 $(X_{CP},Y_{CP},Z_{CP})$ can be used to find the other of the position of the GNSS receiver 110 $(X_{RP},Y_{RP},Z_{RP})$ and the position of the camera 116 $(X_{CP},Y_{CP},Z_{CP})$. In some embodiments, the relationship between (e.g., angle formed by) the second offset vector $(X_{O2},Y_{O2},Z_{O2})$ and the orientation of the camera 116 $(X_{CO}, Y_{CO}, Z_{CO})$ is known and may be utilized in a way such that knowledge of the orientation of the camera 116 $(X_{CO},Y_{CO}, Z_{CO})$ and one of the position of the GNSS receiver 110 $(X_{RP},Y_{RP},Z_{RP})$ and the position of the camera 116 $(X_{CP}, Y_{CP},Z_{CP})$ can be used to find the other of the position of the GNSS receiver 110 $(X_{RP},Y_{RP},Z_{RP})$ and the position of the camera 116 $(X_{CP},Y_{CP},Z_{CP})$. In some embodiments, knowledge of the third offset vector $(X_{O3},Y_{O3},Z_{O3})$ and one of the position of the EDM device 146 $(X_{EP},Y_{EP},Z_{EP})$ and the position of the camera 116 $(X_{CP},Y_{CP},Z_{CP})$ can be used to find the other of the position of the EDM device 146 $(X_{EP},Y_{EP},Z_{EP})$ and the position of the camera 116 $(X_{CP}, Y_{CP},Z_{CP})$. In some embodiments, the relationship between (e.g., angle formed by) the third offset vector $(X_{O3},Y_{O3},Z_{O3})$ and the orientation of the camera 116 $(X_{CO},Y_{CO},Z_{CO})$ is known and may be utilized in a way such that knowledge of the orientation of the camera 116 $(X_{CO},Y_{CO},Z_{CO})$ and one of the position of the EDM device 146 $(X_{EP},Y_{EP},Z_{EP})$ and the position of the camera 116 $(X_{CP},Y_{CP},Z_{CP})$ can be used to find the other of the position of the EDM device 146 $(X_{EP},Y_{EP},Z_{EP})$ and the position of the camera 116 $(X_{CP}, Y_{CP},Z_{CP})$.

Each of the offset vectors has a fixed length when the camera component 101 is attached to the sensor component 102. Because each of the offset vectors have a spatial relationship with the other two offset vectors, knowledge of any two of the offset vectors can be used to find the third offset vector.

Figure 5:
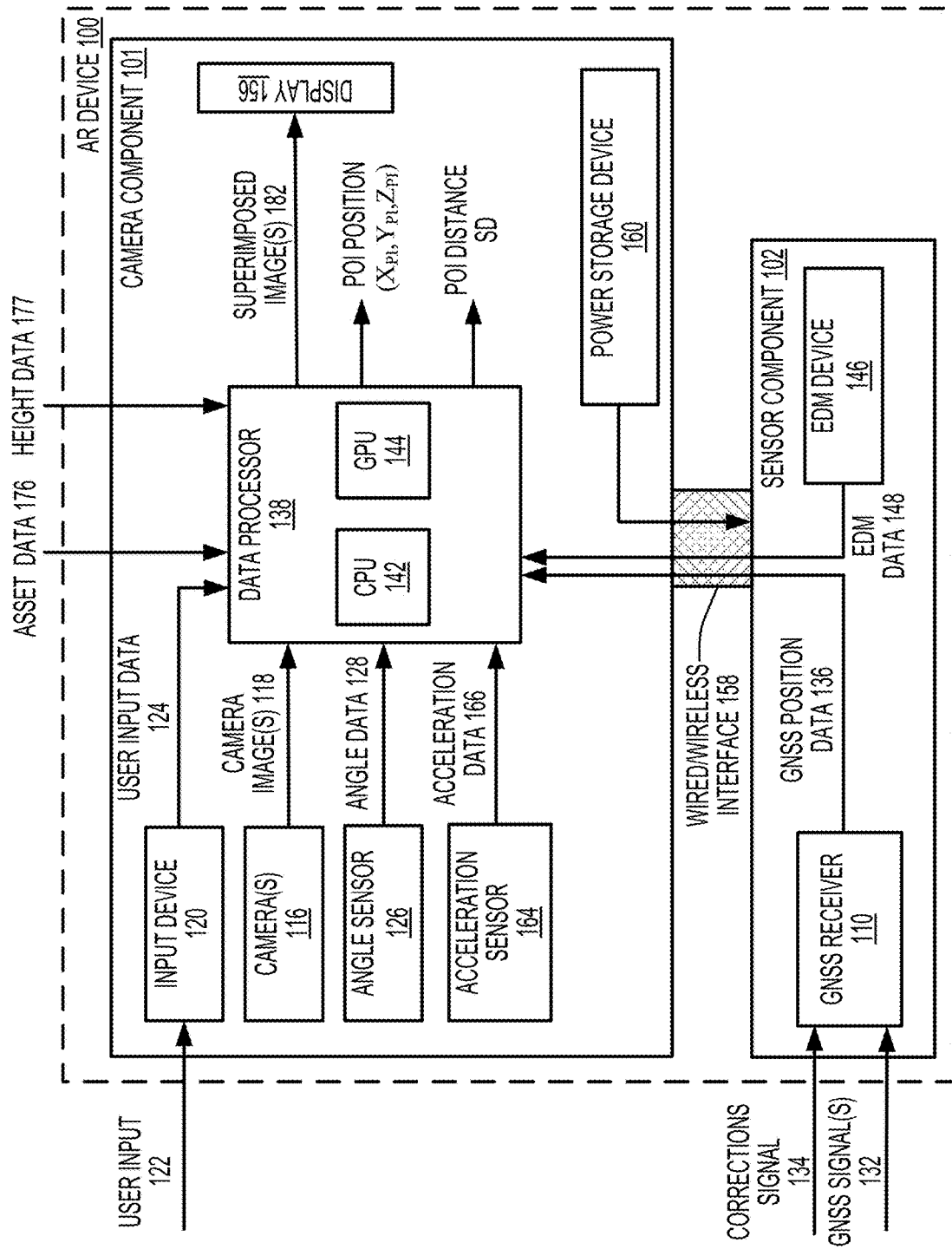
FIG. 5 is a simplified block diagram of an exemplary AR device that may be used with some of the embodiments described herein.

FIG. 5 is a simplified block diagram of an exemplary AR device in which a camera component is attached to a sensor component. Data is communicated from the sensor component 102 to the camera component 101 through a wired/wireless interface 158. In some embodiments, the interface 158 comprises a universal serial bus (USB) through which power and data can be transferred between the components. For example, the camera component 101 may include a power storage device 160 that may transfer power to the sensor component 102 via the interface 158.

In some embodiments, the camera component 101 includes an input device 120 for receiving user input 122 and generating user input data 124 based on the user input. The input device 120 may be a button, a switch, a microphone, a touchscreen (e.g., integrated into a display 156), among other possibilities. The user input 122 may indicate a point of interest (by, for example, moving a crosshair being displayed on the display 156 to indicate the point of interest) for which coordinates are to be calculated. In some embodiments, the camera component 101 includes a camera 116 for generating one or more camera images 118. The camera images 118 may include a single image, multiple images, a stream of images (e.g., a video), among other possibilities.

In some embodiments, the camera component 101 includes an angle sensor or tilt sensor 126 for generating angle data 128 corresponding to the orientation of the camera component 101 (and the AR device 100). The angle sensor 126 may be any electronic device capable of detecting angular rate and/or angular position. In some embodiments, the angle sensor 126 may directly detect angular rate and may integrate to obtain angular position, or alternatively, the angle sensor 126 may directly measure angular position and may determine a change in angular position (e.g., determine the derivative) to obtain angular rate. In many instances, the angle sensor 126 is used to determine a yaw angle, a pitch angle, and/or a roll angle corresponding to the camera component 101 (and the AR device 100).

Accordingly, in various embodiments, the angle data 128 may include one or more of a yaw angle, a pitch angle, a roll angle, an orientation, or raw data from which one or more angles and/or orientations may be calculated. The angle sensor 126 may include one or more gyroscopes and may be included as part of an inertial measurement unit (IMU).

In some embodiments, the camera component 101 includes an acceleration sensor 164 for generating acceleration data 166 corresponding to the camera component 101 (and the AR device 100). The acceleration sensor 164 may be any electronic device capable of detecting linear acceleration. In some embodiments, the acceleration sensor 164 directly measures linear velocity and may determine a change in linear velocity (e.g., determine the derivative) to obtain linear acceleration. Alternatively or additionally, the acceleration sensor 164 may directly measure linear position and may determine a change in linear position (e.g., determine the derivative) to obtain linear velocity from which linear acceleration can be calculated. The acceleration data 166 may include one or more acceleration values or raw data from which one or more acceleration values may be calculated. The acceleration sensor 164 may include one or more accelerometers and may be included as part of an IMU.

In some embodiments, the camera component 101 includes a data processor 138 that includes a central processing unit (CPU) 142 and/or a graphics processing unit (GPU) 144 for processing data and generating various outputs based on the processed data. For example, the data processor 138 may generate the AR model 152 and the superimposed image 182 displayed by the display 156, a position of a point of interest $(X_{PI},Y_{PI},Z_{PI})$, a distance (e.g., a slope distance SD) between the AR device 100 and the point of interest, etc. The data processor 138 may receive data from various sources, including but not limited to, asset data 176 associated with underground assets, height data 177 indicating height or elevation of an area of interest, the user input data 124 generated by the input device 120, the camera image 118 generated by the camera 116, the angle data 128 generated by the angle sensor 126, the acceleration data 166 generated by the acceleration sensor 164, the GNSS position data 136 generated by the GNSS receiver 110, and the EDM data 148 generated by the EDM device 146. The data processor 138 may use multiple types of data to make position and orientation calculations. For example, the data processor 138 may calculate position and/or orientation of the AR device 100, the GNSS receiver 110, the camera 116, and/or the EDM device 146. The data processor 138 may also analyze one or more camera images 118 to supplement orientation calculations based on the angle data 128 or position calculations based on the GNSS position data 136. As another example, the data processor 138 may use the acceleration data 166 to supplement position calculations based on the GNSS position data 136.

In some embodiments, the GNSS receiver 110 receives one or more GNSS signals 132 from one or more GNSS satellites to generate position estimates. In some embodiments, the GNSS receiver 110 also receives a corrections signal 134 (using a same or different antenna) and applies corrections to the position estimates, allowing the position estimates to improve from meter accuracy to centimeter accuracy in many cases. Alternatively or additionally, the corrections signal 134 may be received by the camera component 101 (e.g., via a wireless interface), and the data processor 138 may apply the corrections to the position estimates after receiving the GNSS position data 136 from the GNSS receiver 110.

Figure 6:
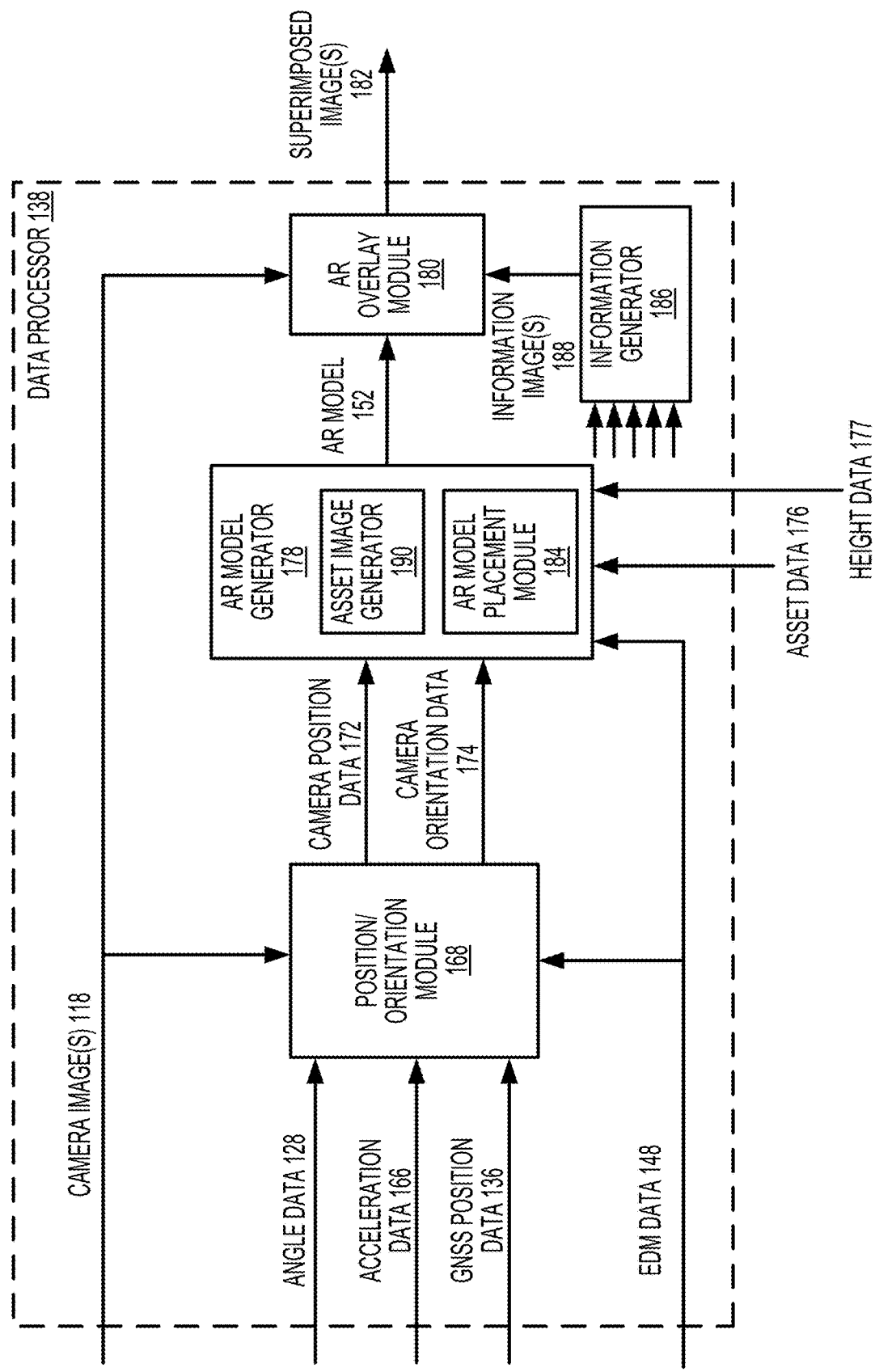
FIG. 6 is a simplified block diagram of an exemplary data processor that may be used with some of the embodiments described herein.

FIG. 6 is a simplified block diagram of an exemplary data processor that may be used with some of the embodiments. Each of the modules and generators illustrated in FIG. 6 may be implemented in hardware and/or software. Although multiple modules and generators are shown, some or all of the various modules and/or generators may be consolidated into one single module and/or generator. In some embodiments, the data processor 138 includes a position/orientation module 168 for determining camera position data 172 and camera orientation data 174. In some embodiments, the camera position data 172 may include a 3D coordinate (e.g., three real numbers) representing the position of the camera 116 at a particular time. Similarly, the camera orientation data 174 may include a 3D vector (e.g., three real numbers) representing the orientation of camera 116 at a particular time. The position/orientation module 168 may be configured to output positions and orientations periodically, at non-regular intervals, or upon receiving updated data from one or more of the angle data 128, the acceleration data 166, the GNSS position data 136, the EDM data 148, and the camera image 118.

In some embodiments, the position/orientation module 168 determines/updates the camera position data 172 and the camera orientation data 174, based on the GNSS position data 136, each time new GNSS position data 136 is received (referred to as a GNSS point). In some embodiments, the position/orientation module 168 determines/updates the camera position data 172 and the camera orientation data 174 based on the angle data 128, the acceleration data 166, or the camera image 118 each time new angle data 128, acceleration data 166, or camera image 118 is received (referred to as an AR point). In some instances, performance of the AR device 100 is improved when AR points and GNSS points are conjunctively used to determine the camera position data 172. In some instances, this is accomplished by maintaining two separate and independent frames: an AR frame (corresponding to AR points) and a geospatial frame (corresponding to GNSS points). The AR frame represents a camera space that maintains the relationship between different AR points. For example, a first AR point at a first time may be (0, 0, 0) within the AR frame, a second AR point at a second time may be (22.3, −12.6, 0) within the AR frame, and a third AR point at a third time may be (34.0, −22.9, −0.1) within the AR frame. Any operations performed on the AR frame, such as shifting or rotating, causes all points within the AR frame to be similarly affected. For example, shifting the AR frame by (0, 5, 0) would cause the three AR points to become (0, 5, 0), (22.3, −7.6, 0), and (34.0, −17.9, −0.1), respectively.

Similar to the AR frame, the geospatial frame represents a GNSS space that maintains the relationship between different GNSS points (3D positions determined based on the GNSS position data 136). For example, a first GNSS point at a first time may be (10, 10, 10) within the geospatial frame, a second GNSS point at a second time may be (32.3, −2.6, 10) within the geospatial frame, and a third GNSS point at a third time may be (44.0, −12.9, 9.9) within the geospatial frame. Any operations performed on the geospatial frame, such as shifting or rotating, causes all points within the geospatial frame to be similarly affected. For example, shifting the geospatial frame by (0, 5, 0) would cause the three GNSS points to become (10, 15, 10), (32.3, 2.4, 10), and (44.0, −7.9, 9.9), respectively.

In an ideal scenario, AR points and GNSS points would be generated by position/orientation module 168 simultaneously and would be identical to each other. However, due to the differences between the two technologies, this is generally not the case. For example, the GNSS position data 136 is generally received less frequently than camera images 118, is generally more accurate and stable than image-based pose data (e.g., centimeter accuracy), and does not suffer from initialization issues that are problematic for image-based pose data, e.g., the establishment of a new temporary local reference frame with the first AR point is generally set to (0, 0, 0). Furthermore, because of the initialization issues associated with image-based pose data (and due to its inferior accuracy and drift over time and distance), the AR frame and the geospatial frame do not necessarily correspond to each other and therefore must be reconciled. To resolve these issues, among others, the position/orientation module 168 may use known techniques in order to determine the camera position data 172 and the camera orientation data 174 that incorporate both image-based pose data and the GNSS position data 136.

In some embodiments, the AR device 100 includes an AR model generator 178 for generating the AR model 152. In some embodiments, the AR model generator 178 may include an asset image or asset representation generator 190. In some instances, the AR model generator 178 may receive the asset data 176 via a wired or wireless connection that defines an underground asset (e.g., manholes, pipes, underground utilities, etc.). The asset data 176 may include 3D coordinates corresponding to the underground assets as well as other information for generating AR model 152, such as size, shape, type, etc. In some embodiments, the asset image or representation generator 190 may be configured to generate virtual representations (e.g., 2D or 3D representations) of the underground assets. In some embodiments, the AR model generator 178 may further include an AR model placement module 184. The AR model placement module 184 may be configured to determine the placement of the AR model 152 in relation to the real-world objects captured by the camera image 118. The AR model placement module 184 may determine the placement of the AR model 152 within the camera image 118 based on the camera position data 172, the camera orientation data 174, the asset data 176, the height data 177, the EDM data 148, etc.

In some embodiments, the AR model generator 178 generates the AR model 152 based on each of the camera position data 172, the camera orientation data 174, the asset data 176, the placement of the AR model, etc. For example, as the camera position and/or orientation changes, the AR model 152 may also be modified to accurately reflect the difference in position and/or orientation (e.g., as the camera 116 points further away from the position of the AR device 100, the AR model 152 may become smaller). In some embodiments, the AR model 152 is held static until a change in one or more of the camera position data 172, the camera orientation data 174, the asset data 176, the placement of the AR model, etc., is detected by AR model generator 178.

In some embodiments, the AR device 100 includes an AR overlay module 180 for generating a superimposed image 182 by superimposing the AR model 152 onto the camera image 118 (or by superimposing the camera image 118 onto the AR model 152). In some instances, the superimposed image 182 is output to the display 156 that displays the superimposed image 182 for viewing by a user. In some embodiments, the AR device 100 includes an information generator 186 for generating information that may be added to the superimposed image 182. For example, the information generator 186 may generate an information image 188 that may visually display information about the underground assets (e.g., position, size, type, year established, etc.), the position/orientation of AR device 100, a position of a point of interest ($X_{PI}, Y_{PI}, Z_{PI}$), a distance to the point of interest, among other possibilities. Accordingly, the superimposed image 182 may be generated to include portions of the camera image 118, the AR model 152, and/or the information image 188. In some instances, a user may select the content to be included in the information image 188 for display.

Figure 7:
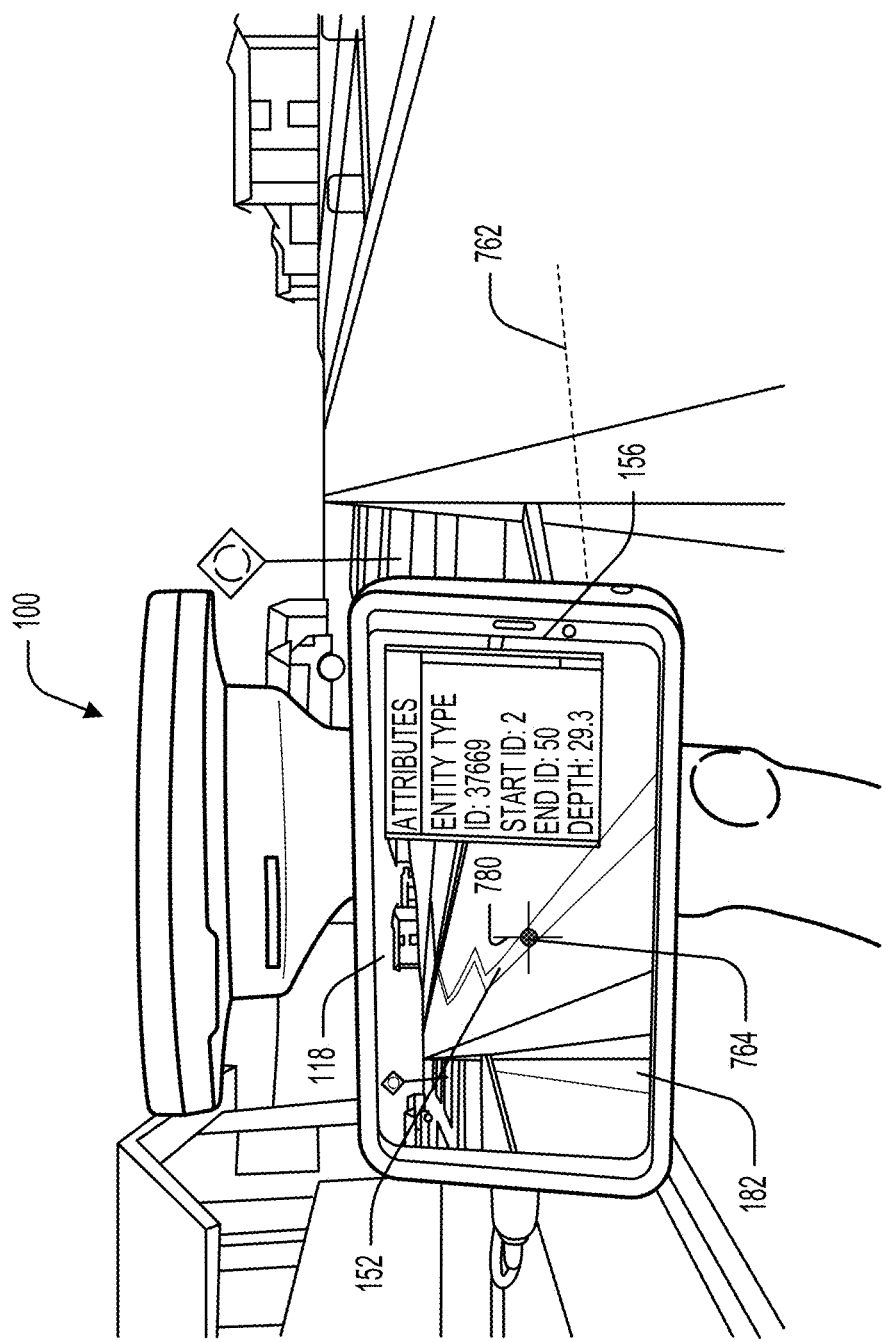
FIG. 7 is a simplified diagram showing a superimposed image displayed by an exemplary AR device in accordance with an embodiment.

FIG. 7 is a simplified diagram showing a superimposed image displayed by an exemplary AR device in accordance with an embodiment. This figure is similar to FIG. 1 in that it shows the AR device 100 including the display 156 for displaying both the AR model 152 and the camera image 118. The AR model 152 and the camera image 118 are superimposed to provide the superimposed image 182.

This figure is different than FIG. 1 in that it shows a point of interest 764 on the display 156. The point of interest is rendered on or overlying the AR model 152. The point of interest 764 is a point that is identified by a user as a location where depth information of a buried asset is desired (the buried asset in this example is a pipe). The location of the point of interest 764 can be identified within the camera image 118 using any means such as crosshairs, a dot, or the like. In the example of FIG. 7, the point of interest is identified using the crosshairs 780 that are provided on the display 156. A button, tap, or other means can be used to select the point of interest 764 once it has been identified. In some embodiments, the display 156 can be a touchscreen allowing the user to tap on a part of the camera image 118 corresponding to the location of the point of interest 764 to identify and/or select the point of interest 764.

FIG. 7 also includes a dotted line 762 representing an emission and/or reflection from the EDM 146 (the EDM 146 is not visible in this figure). In this example, the dotted line 762 extends from the AR device 100 (or from the EDM 146) to the point of interest on the ground. Note that while the point of interest 764 is identified with a small circle 764 on the display 156, and a path of the buried pipe is identified by the AR model 152 on the display 156, these digital features do not exist in the real-world environment. The AR device 100 allows the user to see where the pipe is buried and select a point where a depth of the pipe is to be determined.

The AR model 152 is a virtual representation of the underground asset(s) and may be generated based on asset data associated with each underground asset, such as shape, size (e.g., diameter, depth, length, etc.), type, location, and so on. The AR model 152 may include 2D and/or 3D representations of the underground asset.

Note the attributes displayed on the display 156 of the AR device 100 in FIG. 7 include a depth of the buried pipe below the point of interest 764. This is the calculated depth determined using coordinates of the point of interest 764 and asset data associated with the buried pipe. Methods for determining the depth of the buried pipe are described more fully below.

Figure 8:
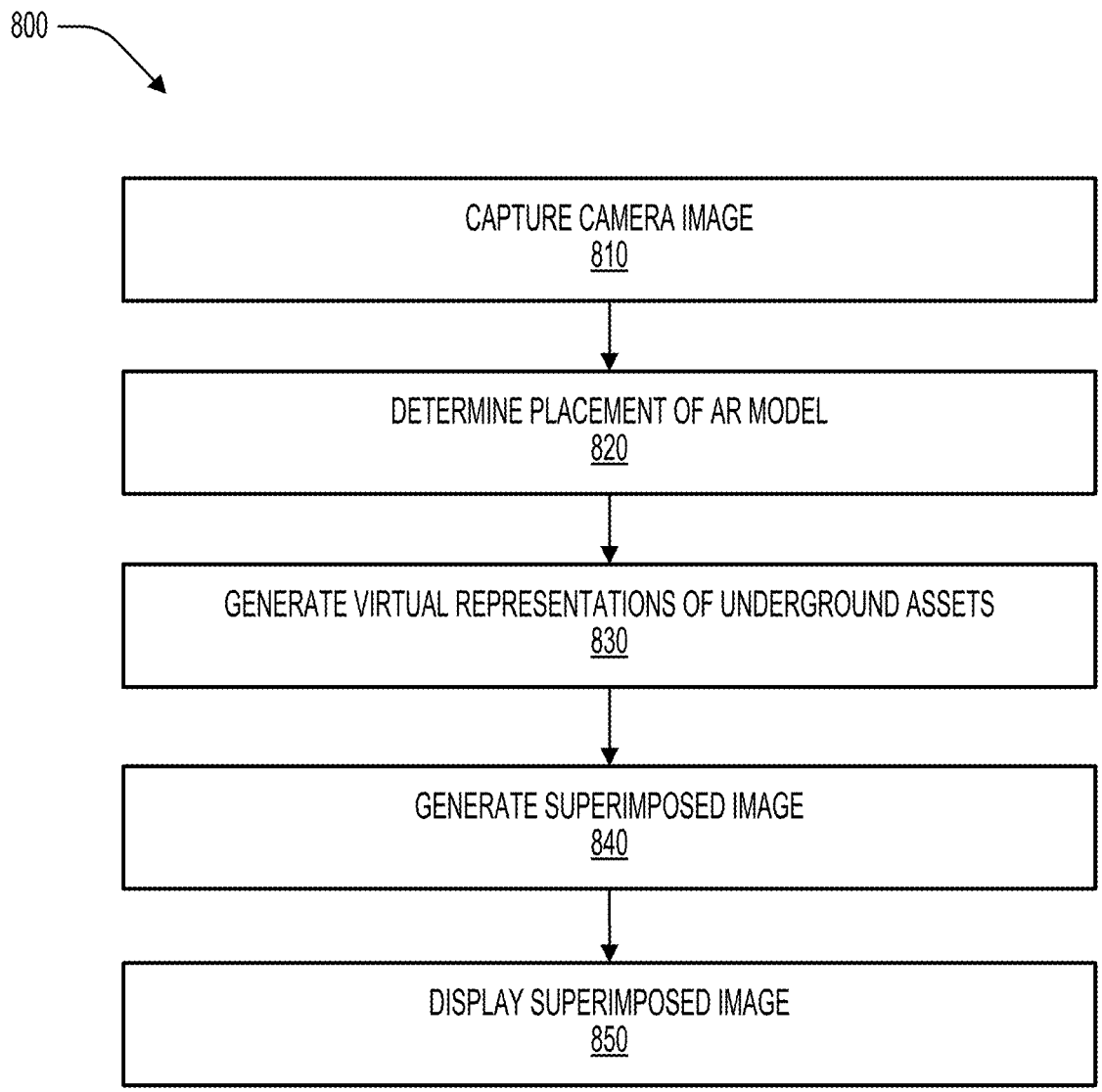
FIG. 8 is a flowchart illustrating a method for displaying a superimposed image.

FIG. 8 is a flowchart illustrating a method for displaying a superimposed image. The steps of method 800 may be performed in any order, and not all steps of method 800 need to be performed. Method 800 may be performed by an AR device, such as the AR device 100, or a similar portable electronic device.

At block 810, a camera image 118 of real-world objects may be captured by a camera, such as the camera 116 of the AR device 100. The camera image 118 may include real-world objects, including a ground surface. The camera image 118 may include a single image, multiple images, a stream of images (e.g., a video), among other possibilities.

At block 820, a location or placement of AR model 152 in the camera image 118 may be determined by the AR device 100. The location or placement of the AR model 152 may be determined such that when the AR model 152 and the camera image 118 are displayed together, the AR model 152 may align or substantially align with the ground surface shown in the camera image 118.

At block 830, virtual representations of one or more underground assets, such as manholes, pipes, underground utilities, etc., may be generated by the AR device 100. The AR device 100 may access the asset data from a database, from memory, or the like. The asset data may include attributes of the underground asset, such as size (e.g., diameter, length, etc.), depth, type, etc. Based on the attributes of the underground asset, the AR device 100 may generate the virtual representation of the underground asset. The AR device 100 may generate an on-surface representation of an underground asset following the contour of the ground surface based on the location (e.g., ground surface location), size, type, and/or other attributes of the underground asset. The on-surface representation may be or include a 2D or 3D virtual representation of the underground asset. The on-surface representation of common underground assets may be displayed using similar colors, but the on-surface representation may be semi-transparent to indicate the underground nature of the displayed asset.

At block 840, a superimposed image 182 may be generated by the AR device 100. The superimposed image 182 may include the camera image 118 and the AR model 152. In some embodiments, when generating the superimposed image 182, the camera component 101 may return a perspective transformation. Based on the perspective of the camera 116 and the size and position of the AR model 152, the AR model 152 may be transformed and rendered to match the perspective of the camera 116, and may be positioned and aligned to the real-world captured by the camera image 118 to generate the superimposed image 182. In some embodiments, when generating the superimposed image 182, the distance between the location of the AR model 152 and the AR device 100 (as measured by, e.g., the EDM device 146) and the orientation of the camera 116 (as measured by, e.g., the tilt and/or angle sensors) may be utilized to determine the scale of the captured camera image 118. Based on the determined scale, the AR device 100 may overlay the AR model 152 onto the camera image 118, such that the AR model 152 may be aligned to the real-world and displayed at the correct size relative to the other real-world objects in the camera image 118. Various other techniques for matching the sizes of the AR model 152 and the camera image 118 may be implemented.

At block 850, the superimposed image 182 may be displayed to a user via the display 156 of the AR device 100.

One or more of the above operations of method 800 may be performed simultaneously or substantially simultaneously. For example, the superimposed image 182 may be generated and displayed as the AR device 100 captures the camera image 118 in real time and/or in a continuous manner. In other words, generating and/or displaying the superimposed image 182 may also be performed in real time or near real time. As the AR device 100 may be moved by the user, the camera image 118 may be updated, and the displayed superimposed image 182 may be updated simultaneously or substantially simultaneously. For example, the user may point the camera 116 of the AR device 100 at any point of interest, and an updated superimposed image 182 may be generated and displayed to the user as the point of interest changes. This way, the user may follow the underground asset (or the AR model representing the underground asset). The terms "simultaneous(ly)" and "real time" used herein generally refer to the scenario where the superimposed image 182 may be generated, displayed, or updated immediately after the camera image 118 may be captured or updated, and a perceptible delay may or may not be observed by the user. In some embodiments, the delay between the time the camera image 118 is captured or updated and the time the superimposed image 182 may be generated, displayed, or updated may be less than a few seconds (e.g., less than 10 seconds, less than 1 second, less than 500 milliseconds, less than 100 milliseconds, less than 10 milliseconds, less than 1 milliseconds, or less).

As will be discussed in more detail below, each operation of method 800 may include one or more sub-operations. It should be noted that the sub-operations of each operation of method 800 may be performed in any order and may be performed simultaneously. Additionally, one or more sub-operations of one operation of method 800, and one or more sub-operations of another operation of method 800, may be performed in any order and may be performed simultaneously. Thus, one or more operations of method 800 may not be performed or completed before one or more other operations of method 800 may begin.

Figure 9:
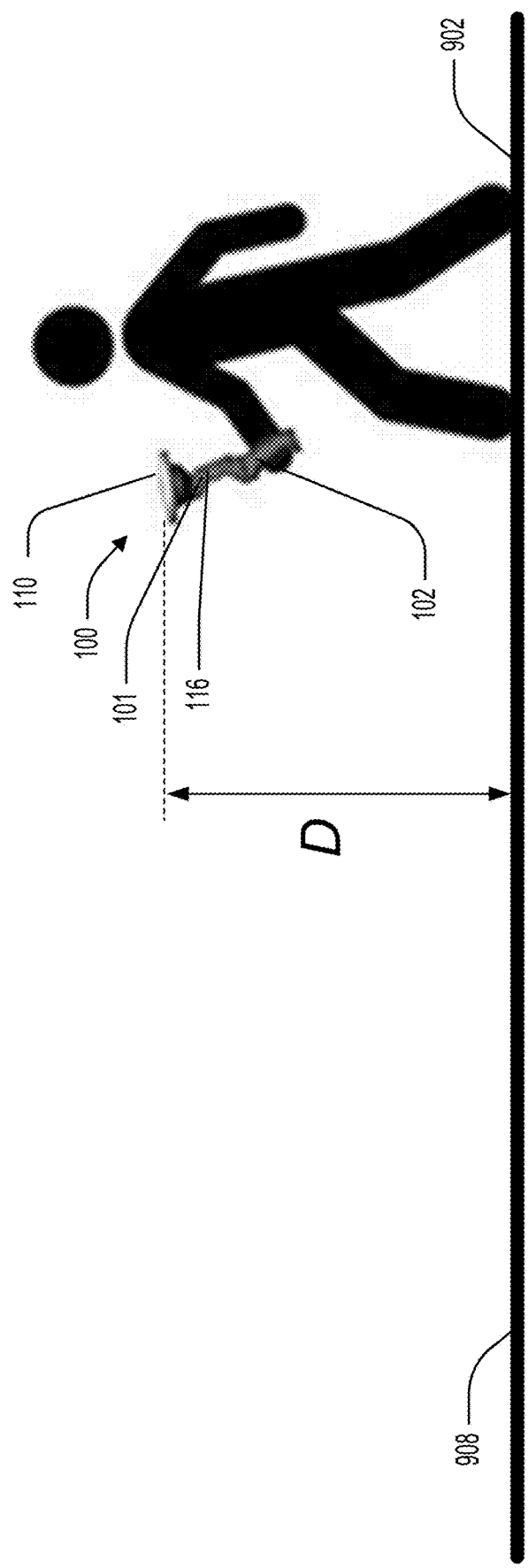
FIG. 9 illustrates a method for determining a placement or position of an AR model with respect to the real-world.

FIG. 9 illustrates a method for determining the placement or position of the AR model with respect to the real-world. In some embodiments, the position of the AR device 100 or one or more components thereof may be known. For example, the position of the GNSS receiver 110 or the antenna thereof may be known or determined based on signals received from GNSS satellites. The position of the camera 116 may also be known. For example, based on the relative positions of the GNSS receiver 110 and the camera 116, which may be represented by an offset vector, the position of the GNSS receiver 110 and the position of the camera 116 (e.g., the center of aperture of the camera 116) may be determined.

In some embodiments, the position of the camera 116 may be known or determined independent or semi-independent of the position of the GNSS receiver 110. For example, the camera component 101 may include another GNSS receiver for receiving GNSS signals for determining the location of the camera 116. Alternatively, the position of the camera 116 may be determined using the position of the GNSS receiver 110 and the offset vector initially, and subsequently the change in position of the camera 116 may be tracked by sensors (e.g., accelerometers, gyroscopes, etc.) of the AR device 100 to obtain an updated position of the camera 116. Updating and/or determining the position of the camera 116 using local sensors may allow the position of the camera 116 to be available even when the GNSS signals are interrupted. The position of the camera 116 obtained using the local sensors may then be calibrated or synchronized using the GNSS signals when such signals become available.

In some embodiments, the orientation of the AR device 100 or one or more components thereof may be determined. For example, the orientation of the AR device 100 may be determined using known calibration techniques, and changes in the orientation of the AR device 100 may be determined utilizing an angle sensor or tilt sensor that may be included in the camera component 101 and/or the sensor component 102 of the AR device 100. The orientation of the camera 116 may correspond to a point at which the camera 116 is pointed and/or the viewing direction of the camera 116 determined by the user.

The AR device 100 may determine an estimated ground surface or ground plane 902 based on the position of the GNSS receiver 110 and/or the position of the camera 116. For example, the AR device 100 may determine the estimated ground plane 902 to be at a predetermined distance D below the GNSS receiver 110 or the camera 116. The estimated ground plane 902 may approximately coincide with a ground surface 908 (typically within a few inches). The predetermined distance D may be determined based on a typical or average height at which the AR device 100 may be held or positioned by a user. In some embodiments, the predetermined distance D may be between 1.2 m to 1.8 m, such as about 1.5 m. The predetermined distance D may be adjusted and/or set for different users. By utilizing an estimated ground plane 902, the placement of the AR model 152 in the real-world as captured by the camera 116 may be quickly determined.

Figure 10:
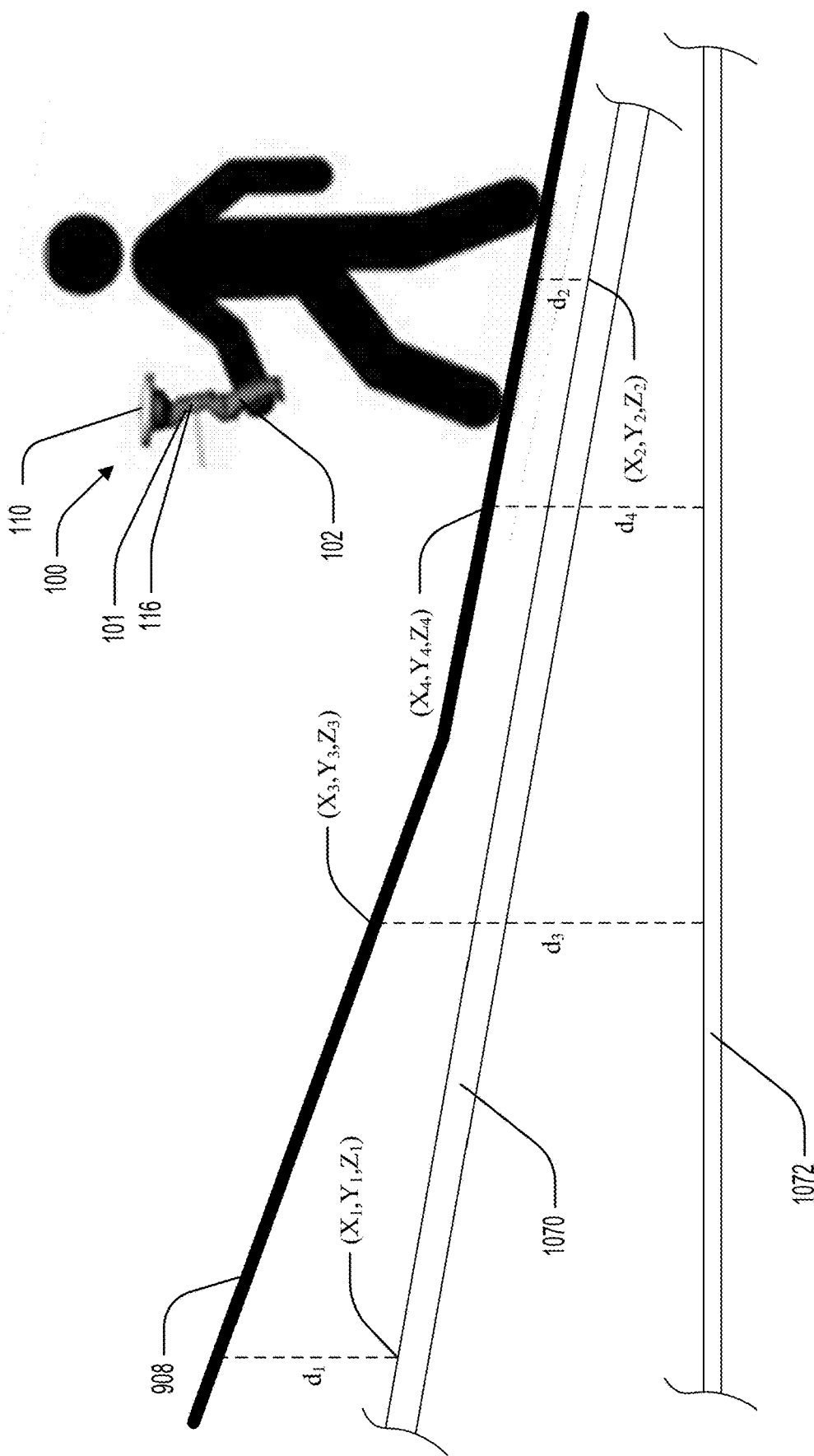
FIG. 10 illustrates another method for determining a placement or position of an AR model with respect to the real-world.

FIG. 10 illustrates another method for determining the placement or position of the AR model with respect to the real-world. As mentioned above, each underground asset 1070, 7072 may be associated with asset data. The asset data may include depth information of the underground assets 1070, 7072 indicating the distance between the ground surface 908 and the underground assets 1070, 1072 (such as $d_1$, $d_2$, $d_3$, and $d_4$ shown in FIG. 10).

The asset data may further include location information of the underground assets 1070, 7072 in the form of, e.g., geospatial coordinates, similar to the position coordinates of the GNSS receiver 110, the camera 116, the EDM device 146, etc., as discussed above. In some embodiments, the location information of the underground assets 1070, 7072 may be or include underground location information of the underground assets 1070, 7072 (such as $(X_1,Y_1,Z_1)$ and $(X_2,Y_2,Z_2)$ shown in FIG. 10). In some embodiments, the location information of the underground assets 1070, 7072 may be or include surface location information of the underground assets 1070, 7072, which represents the location of the portion of the ground surface 908 directly above the underground assets 1070, 7072 (such as $(X_3,Y_3,Z_3)$ and $(X_4,Y_4,Z_4)$ shown in FIG. 10). Although only two data points are shown in FIG. 10 for each underground asset 1070, 7072, the asset data may include more than two data points. Depending on the data available, the AR device 100 may extract directly or derive from the asset data an estimated location of the ground surface 908 directly above the underground assets 1070, 7072. In some embodiments, the AR device 100 may calculate the slope or grade of the ground surface 908 based on the depth variation of the underground assets 1070, 7072. The extracted or derived information may correspond to a line or a strip approximately on the ground surface 908 along the extension of an underground asset.

The AR device 100 may create an AR model 152 for each underground asset 1070, 7072 based on the asset data associated therewith. The AR models may be projected approximately onto the ground surface 908 as determined using the surface location information. Using the surface location information may be useful to determine an approximate depth of the underground assets 1070, 7072 at specific points, but contours and elevations of the ground surface may change over time making this information less reliable for determining accurate depths of the underground assets 1070, 7072.

Other known techniques for determining an estimated ground plane or ground surface may be used with embodiments described herein. Some techniques are described, for example, in U.S. Pat. No. 10,872,466, the entire contents of which are incorporated herein by reference.

Figure 11:
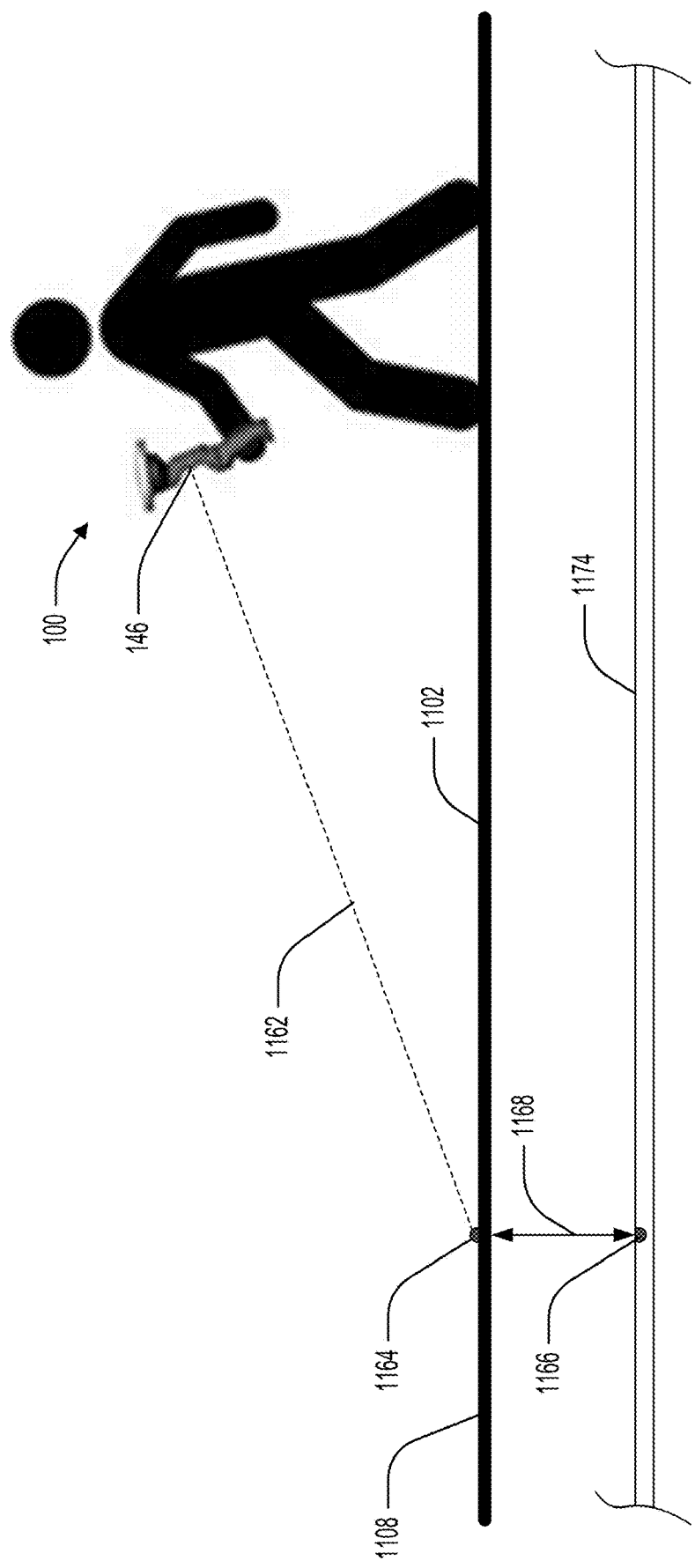
FIGS. 11-12 are simplified diagrams illustrating methods for determining a depth of a buried asset in accordance with some embodiments.

FIG. 11 is a simplified diagram illustrating a method for determining a depth of a buried asset in accordance with an embodiment. In this example, a user aligns an AR device 100 with a point of interest 1164 using, for example, crosshairs on a display (such as crosshairs 780 on display 156 in FIG. 7). Although not visible in this figure, an AR model 152 of a buried asset 1174 may be projected onto an estimated ground plane 1102 or ground surface 1108 and superimposed on a camera image 118 to provide a superimposed image 182. The superimposed image 182 may be provided on a display 156 of the AR device 100 to the user. The point of interest 1164 is a point on the AR model 152 or on the ground near the AR model 152 where a depth of the buried asset 1174 is desired. The point of interest 1164 and a corresponding point 1166 on the buried asset 1174 are shown in FIG. 11.

A position and orientation of the AR device 100 may be known or determined as described previously, and a distance from the AR device 100 to the point of interest 1164 may be determined using an EDM 146. In this figure, a dotted line 1162 represents an emission and/or reflection from the EDM 146. Using the position and orientation of the AR device 100 and the distance between the AR device 100 and the point of interest 1164, coordinates of the point of interest 1164 may be determined in accordance with known techniques. This provides an accurate measurement of the coordinates at the point of interest 1164. This is especially beneficial if the elevation or contour of the ground surface varies or has changed since asset data was obtained (such as at a construction site).

The AR device 100 is configured to accesses the asset data to obtain location information associated with the buried asset 1174. The location information may include positions of the buried asset 1174 at discrete points. The AR device 100 may determine an elevation of the buried asset 1174 at the point 1166 using one or more of the positions of the buried asset 1174 obtained from the asset data. The depth 1168 of the buried asset 1174 below the point of interest 1164 may be determined based on a difference in elevation between the point of interest 1164 and the corresponding point 1166 on the buried asset 1174.

The elevation of the buried asset 1174 at the point 1166 can be determined in a number of different ways. As an example, 3D positions of the buried asset 1174 can be determined using the location information, and the elevation of the buried asset 1174 at the point 1166 can be determined as the closest point on the buried asset 1174 to the point of interest 1164. As another example, the location information can be used directly to provide an estimate of the elevation of the point 1066.

Figure 12:
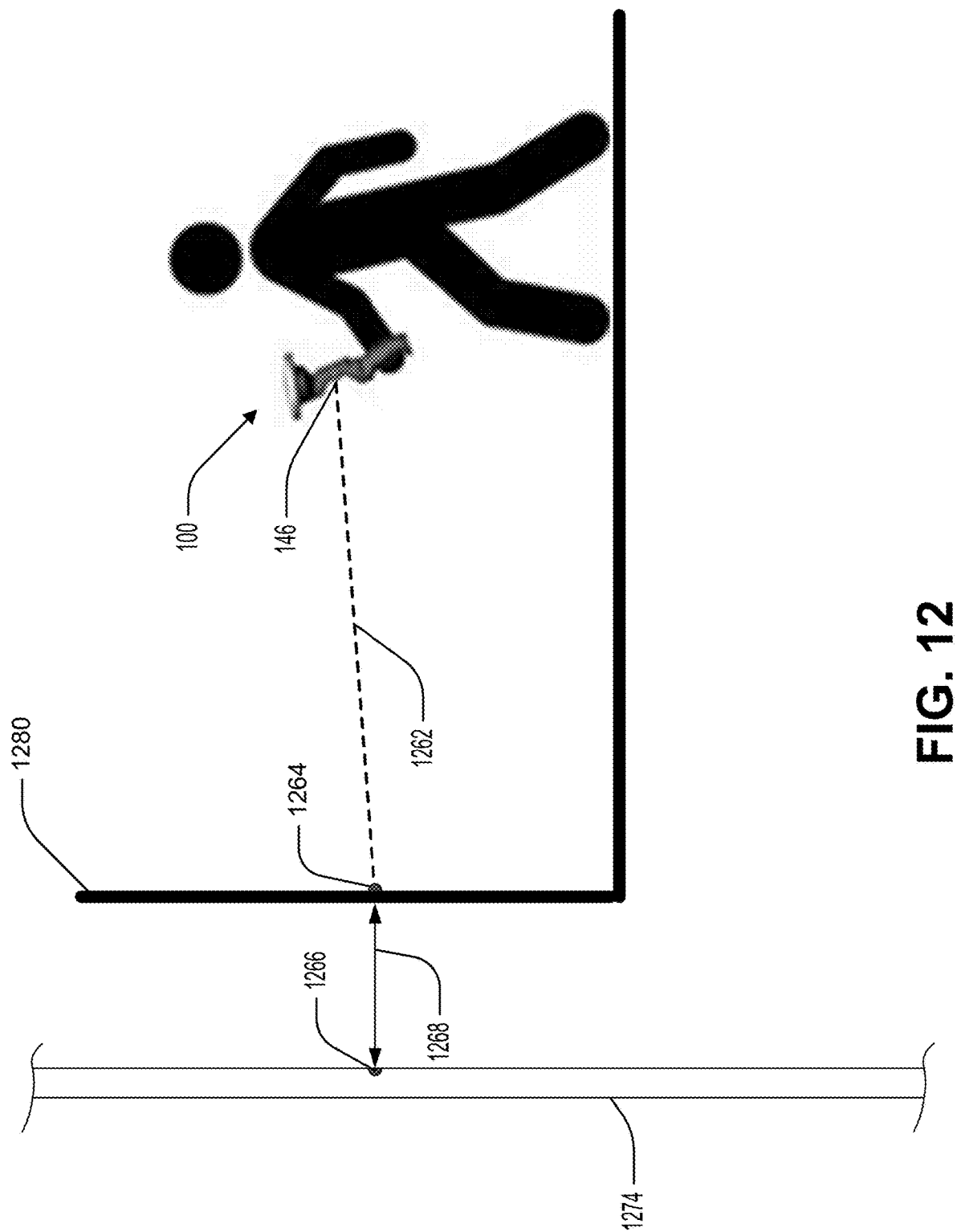

FIG. 12 is a simplified diagram illustrating another method for determining a depth of a buried asset in accordance with an embodiment. This example is similar to that of FIG. 11 except a buried asset 1274 is behind a wall 1280 rather than underground. Although not visible in this figure, an AR model 152 of the buried asset 1274 may be projected onto an estimated surface of the wall 1280 and superimposed on a camera image 118 to provide a superimposed image 182. The superimposed image 182 may be provided on a display 156 of the AR device 100 to a user. A point of interest 1264 is a point on the AR model 152 or on the wall 1280 near the AR model 152 where a depth of the buried asset 1274 is desired. The point of interest 1264 and a corresponding point 1266 on the buried asset 1274 are shown in FIG. 12.

A position and orientation of the AR device 100 may be known or determined as described previously, and a distance from the AR device 100 to the point of interest 1264 may be determined using an EDM 146. A dotted line 1262 represents an emission and/or reflection from the EDM 146. Using the position and orientation of the AR device 100, and the distance between the AR device 100 and the point of interest 1264, coordinates of the point of interest 1264 may be determined in accordance with known techniques.

The AR device 100 is configured to accesses asset data to obtain location information associated with the buried asset 1274. The location information may include positions of the buried asset 1274 at discrete points. The AR device 100 may determine a distance 1268 between the point of interest and a closest point (point 1266) on the buried asset 1274 using one or more of the positions of the buried asset 1274 obtained from the asset data.

Figure 13:
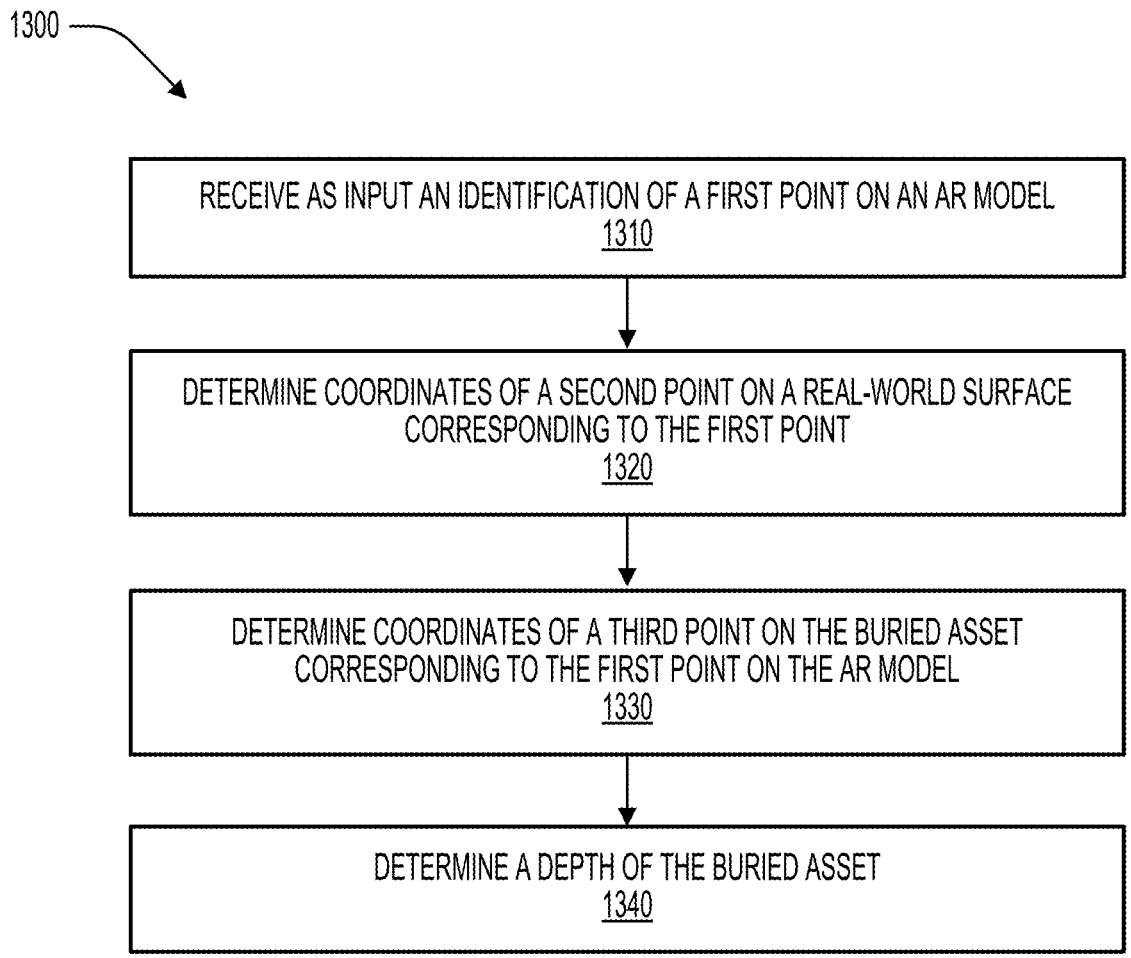
FIG. 13 is a flowchart illustrating a method for determining a depth of a buried asset in accordance with an embodiment.

FIG. 13 is a flowchart illustrating a method for determining a depth of a buried asset in accordance with an embodiment. The method includes receiving an identification of a first point on an AR model (1310) as input. The first point is a point where a depth of the buried asset is to be determined. The first point may be identified by a user using, for example, crosshairs on a display of an AR device. The AR model may be a 2D or 3D representation of the buried asset projected onto a virtual surface or plane that is arranged to approximately correspond to a real-world surface that extends between the user of the AR device and the buried asset (e.g., the ground or a wall, ceiling, floor, etc.). The virtual surface or plane may be arranged, for example, at a fixed distance from the AR device, or the virtual surface or plane may be arranged relative to the real-world surface using asset data associated with the buried asset. The AR model is superimposed onto the image information that includes the real-world surface and that is provided to a user on the display of the AR device.

The method also includes determining coordinates of a second point on the real-world surface corresponding to the first point (1320). The coordinates of the second point may be real-world coordinates that are determined while the AR device is aligned with the second point. Determining the coordinates of the second point may include determining real-world coordinates of the AR device using a position measurement apparatus, determining an azimuth of the AR device, determining a tilt of the AR device using one or more sensors, and determining a distance from the AR device to the second point using a distance measuring apparatus.

In an embodiment, the position measurement apparatus may be a GNSS receiver or other device configured to determine position information, and the distance measuring apparatus may be an EDM, lidar or other device configured to determine distance information. The one or more sensors may be, for example, an IMU or other sensor configured to determine tilt information. In some embodiments, the azimuth is determined by tracking lateral movement of the AR device using the position measurement apparatus and tracking rotation of the AR device using an IMU or other sensors configured to measure rotational movement.

The method also includes determining coordinates of a third point on the buried asset corresponding to the first point on the AR model (1330). The coordinates of the third point may be real-world coordinates that are determined using location information obtained from the asset data.

The method also includes determining the depth of the buried asset (1340). The depth may be a distance above, below, or laterally from the second point on the real-world surface. The depth may be determined based on the real-world coordinates of the second point on the real-world surface and the real-world coordinates of the third point on the buried asset.

It should be appreciated that the specific steps illustrated in FIG. 13 provide a particular method according to an embodiment. Other sequences of steps may also be performed according to alternative embodiments. For example, some embodiments may perform the steps outlined above in a different order. Moreover, some of the individual steps illustrated in FIG. 13 may be optional and/or may include multiple sub-steps that may be performed in various sequences. Furthermore, additional steps may be added or removed depending on the particular application.

Figure 14:
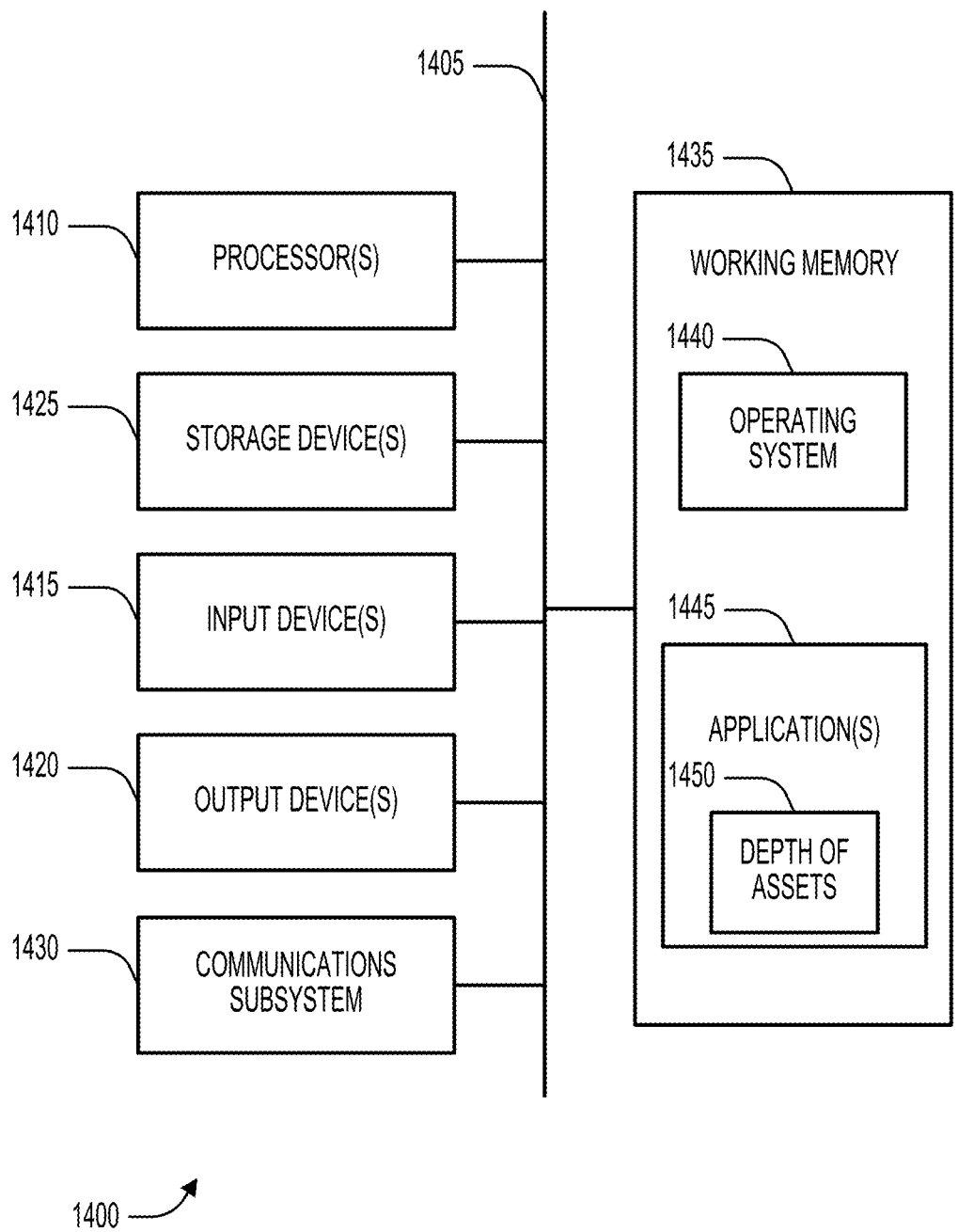
FIG. 14 is a simplified block diagram of a computer system that may be used to implement some of the embodiments.

FIG. 14 is a simplified block diagram of a computer system that may be used to implement some of the embodiments described herein. A computer system 1400 as illustrated in FIG. 14 may be incorporated into devices such as a portable electronic device, mobile phone, or other device, including the AR device 100 as described herein. FIG. 14 provides a schematic illustration of one embodiment of a computer system 1400 that can perform some or all of the steps or operations of the methods provided by various embodiments, such as the various operations for determining a depth of a buried asset. It should be noted that FIG. 14 is meant only to provide an exemplary illustration of various components, any or all of which may be utilized as appropriate. FIG. 14, therefore, broadly illustrates how individual system elements may be implemented in a relatively separated or more integrated manner.

The computer system 1400 is shown comprising hardware elements that can be electrically coupled via a bus 1405 or may otherwise be in communication, as appropriate. The hardware elements may include one or more processors 1410, including without limitation one or more general-purpose processors and/or one or more special-purpose processors, such as digital signal processing chips, graphics acceleration processors, and/or the like. The hardware elements also include one or more input devices 1415, which may comprise, without limitation, a mouse, a keyboard, a camera, and/or the like; and one or more output devices 1420, which can include, without limitation, a display device, a printer, and/or the like.

The computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 1400 might also include a communications subsystem 1430, which can include, without limitation, a modem, a network card (wireless or wired), an infrared communication device, a wireless communication device, and/or a chipset, such as a Bluetooth™ device, an 802.11 device, a WiFi device, a WiMax device, cellular communication facilities, etc., and/or the like. The communications subsystem 1430 may include one or more input and/or output communication interfaces to permit data to be exchanged with a network such as the network described below to name one example, to other computer systems and/or any other devices described herein. Depending on the desired functionality and/or other implementation concerns, a portable electronic device or similar device may communicate image and/or other information via the communications subsystem 1430. In other embodiments, a portable electronic device, e.g. the AR device, may be incorporated into the computer system 1400, e.g., an electronic device as an input device 1415. In some embodiments, the computer system 1400 will further comprise a working memory 1435, which can include a RAM or ROM device, as described above.

The computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer. In an aspect, then, such code and/or instructions can be used to configure and/or adapt a general-purpose computer or other device to perform one or more operations in accordance with the described methods. For example, in some embodiments, the computer system 1400 may include an application 1450 in the form of, e.g., executable programs and/or code, for implementing one or more of the methods or operations described herein, such as the methods and/or operations for determining the depth of a buried asset, for generating the superimposed image, etc.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc, and/or provided in an installation package) such that the storage medium can be used to program, configure, and/or adapt a general-purpose computer with the instructions/code stored thereon. These instructions might take the form of executable code, which is executable by the computer system 1400 and/or might take the form of source and/or installable code, which, upon compilation and/or installation on the computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1400 to perform methods in accordance with various embodiments of the technology. According to a set of embodiments, some or all of the procedures of such methods are performed by the computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks (such as the storage device(s) 1425). Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, such as punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1430 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. In addition, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for determining a depth of a pipe buried in the ground, the method comprising:

using an augmented reality (AR) device to view an AR model of the pipe, the AR model projected onto a virtual surface or plane that is arranged to approximately correspond to a surface of the ground, the AR model superimposed onto an image that includes the surface of the ground and that is displayed on a display of the AR device, the AR model being a two-dimensional (2D) or three-dimensional (3D) representation of the pipe projected onto the virtual surface or plane at locations directly above the pipe;

identifying a first point on the AR model of the pipe where a depth of the pipe below the surface of the ground is to be determined;

using the AR device to determine real-world coordinates of a second point on the surface of the ground corresponding to the first point on the AR model of the pipe, wherein determining the real-world coordinates of the second point includes aligning the AR device with the second point and performing steps comprising:
determining real-world coordinates of the AR device;
determining an orientation of the AR device; and
determining a distance from the AR device to the second point;
determining real-world coordinates of a third point on the pipe buried in the ground corresponding to the first point on the AR model of the pipe projected onto the virtual surface or plane directly above the pipe; and
determining a depth of the pipe buried in the ground based on a difference in elevation between the real-world coordinates of the second point on the surface of the ground and the real-world coordinates of the third point on the pipe.

2. The method of claim 1 wherein the virtual surface or plane is arranged at a fixed distance from the real-world coordinates of the AR device.

3. The method of claim 1 wherein the virtual surface or plane is arranged relative to the surface of the ground using asset data associated with the pipe buried in the ground.

4. The method of claim 1 wherein the first point on the AR model of the pipe is identified on the AR model superimposed onto the image and displayed on the display of the AR device.

5. The method of claim 1 wherein the orientation of the AR device is determined at least in part based on movement of the AR device.

6. The method of claim 1 wherein the real-world coordinates of the third point on the pipe buried in the ground are determined using asset data associated with the pipe.

7. An augmented reality (AR) device, comprising:
a position measurement apparatus for determining real-world coordinates of the AR device;
one or more sensors for determining tilt of the AR device;
a distance measuring apparatus for determining distances between the AR device and surrounding objects;
an imaging apparatus for obtaining image information; and
a display for displaying the image information and for displaying an AR model superimposed onto the image information, wherein the AR device is configured for determining depth of a buried asset by:
receiving as input an identification of a first point on the AR model where a depth of the buried asset is to be determined, wherein the AR model is a two-dimensional (2D) or three-dimensional (3D) representation of the buried asset projected onto a virtual surface or plane that is arranged to approximately correspond to a real-world surface that extends between a user of the AR device and the buried asset, the AR model being superimposed onto the image information that includes the real-world surface and that is displayed on the display of the AR device;
determining real-world coordinates of a second point on the real-world surface corresponding to the first point on the AR model of the buried asset, wherein the real-world coordinates of the second point are determined while the AR device is aligned with the second point and includes steps comprising:
determining real-world coordinates of the AR device using the position measurement apparatus;
determining an azimuth of the AR device;
determining a tilt of the AR device using the one or more sensors; and
determining a distance from the AR device to the second point using the distance measuring apparatus;
determining real-world coordinates of a third point on the buried asset corresponding to the first point on the AR model of the buried asset; and
determining the depth of the buried asset either above, below, or laterally from the second point on the real-world surface based on the real-world coordinates of the second point on the real-world surface and the real-world coordinates of the third point on the buried asset.

8. The AR device of claim 7 wherein the buried asset is a pipe or conduit and the real-world surface is the ground or a ceiling, floor, or wall of a structure.

9. The AR device of claim 7 wherein the virtual surface or plane is arranged at a fixed distance from the real-world coordinates of the AR device.

10. The AR device of claim 7 wherein the position measurement apparatus is a global navigation satellite system (GNSS) device, and the distance measuring apparatus is an electronic distance measurement (EDM) device.

11. The AR device of claim 7 wherein the position measurement apparatus is a global navigation satellite system (GNSS) device, and the distance measuring apparatus is a lidar device.

12. The AR device of claim 7 wherein the AR device is further configured to output the depth of the buried asset on the display.

13. The AR device of claim 7 wherein the real-world coordinates of the third point on the buried asset are determined using asset data associated with the buried asset.

14. The AR device of claim 7 wherein the AR device includes a smart phone or tablet.

15. A non-transitory computer readable medium storing instructions that, when executed by a processor, cause an augmented reality (AR) device to determine a depth of a buried asset by performing steps comprising:
superimposing an AR model onto image information that includes a real-world surface and that is displayed on a display of the AR device, wherein the AR model is projected onto a virtual surface or plane that is arranged to approximately correspond to the real-world surface that extends between a user of the AR device and the buried asset, the AR model being a two-dimensional (2D) or three-dimensional (3D) representation of the buried asset;
receiving as input an identification of a first point on the AR model of the buried asset where the depth of the buried asset is to be determined;
determining real-world coordinates of a second point on the real-world surface corresponding to the first point on the AR model of the buried asset, wherein the real-world coordinates of the second point are determined while the AR device is aligned with the second point and includes steps comprising:
determining real-world coordinates of the AR device;
determining an orientation of the AR device; and
determining a distance from the AR device to the second point;
determining real-world coordinates of a third point on the buried asset corresponding to the first point on the AR model of the buried asset; and
determining the depth of the buried asset either above, below, or laterally from the second point on the real-world surface based on the real-world coordinates of the second point on the real-world surface and the real-world coordinates of the third point on the buried asset.

16. The non-transitory computer readable medium of claim 15 wherein the buried asset is a pipe or conduit and the real-world surface is the ground or a ceiling, floor, or wall of a structure.

17. The non-transitory computer readable medium of claim 15 wherein the virtual surface or plane is arranged at a fixed distance from the real-world coordinates of the AR device.

18. The non-transitory computer readable medium of claim 15 wherein an azimuth of the AR device is determined based on movement of the AR device.

19. The non-transitory computer readable medium of claim 15 further comprising instructions for outputting the depth of the buried asset on the display.

20. The non-transitory computer readable medium of claim 15 wherein the real-world coordinates of the third point on the buried asset are determined using asset data associated with the buried asset.

\* \* \* \* \*